United States Patent
Karpman et al.

(10) Patent No.: US 8,315,741 B2
(45) Date of Patent: Nov. 20, 2012

(54) HIGH FIDELITY INTEGRATED HEAT TRANSFER AND CLEARANCE IN COMPONENT-LEVEL DYNAMIC TURBINE SYSTEM CONTROL

(75) Inventors: Boris Karpman, Marlborough, CT (US); Richard P. Meisner, Glastonbury, CT (US); John L. Shade, Portland, CT (US)

(73) Assignee: United Technologies Corporation, Hartford, CT (US)

( * ) Notice: Subject to any disclaimer, the term of this patent is extended or adjusted under 35 U.S.C. 154(b) by 95 days.

(21) Appl. No.: 12/552,656

(22) Filed: Sep. 2, 2009

(65) Prior Publication Data

US 2011/0054704 A1    Mar. 3, 2011

(51) Int. Cl.
   *G05D 7/00* (2006.01)
   *G05D 11/00* (2006.01)
   *G06G 7/70* (2006.01)
(52) U.S. Cl. .............. 700/282; 415/173.2; 415/115; 701/100; 600/782
(58) Field of Classification Search .............. 700/282; 415/115; 701/100; 60/773, 39.27, 782
   See application file for complete search history.

(56) References Cited

U.S. PATENT DOCUMENTS

| | | | |
|---|---|---|---|
| 3,686,859 A | 8/1972 | White | |
| 3,738,102 A | 6/1973 | Stearns et al. | |
| 3,758,764 A | 9/1973 | Harner | |
| 4,040,250 A | 8/1977 | Saunders et al. | |
| 4,174,617 A * | 11/1979 | Jalali-Karchay | 60/602 |
| 4,197,699 A * | 4/1980 | Parker et al. | 60/773 |
| 4,209,979 A * | 7/1980 | Woodhouse et al. | 60/774 |
| 4,215,412 A | 7/1980 | Bernier et al. | |
| 4,244,181 A * | 1/1981 | Wiher et al. | 60/791 |
| 4,258,424 A * | 3/1981 | Giras et al. | 700/290 |
| 4,266,401 A * | 5/1981 | Sumegi et al. | 60/791 |
| 4,269,027 A * | 5/1981 | Mattson et al. | 60/774 |
| 4,274,253 A * | 6/1981 | Bolliger et al. | 60/773 |
| 4,275,558 A * | 6/1981 | Hatch et al. | 60/791 |
| 4,494,006 A | 1/1985 | Staroselsky et al. | |

(Continued)

FOREIGN PATENT DOCUMENTS

GB    2214331 A    8/1989

(Continued)

OTHER PUBLICATIONS

The Extended European Search Report of related European Application No. 10163183.6 filed Apr. 23, 2010.

*Primary Examiner* — Mohammad Ali
*Assistant Examiner* — Kelvin Booker
(74) *Attorney, Agent, or Firm* — Kinney & Lange, P.A.

(57) ABSTRACT

A system comprises a rotary apparatus, a control law and a processor. The rotary apparatus comprises a rotor and a housing forming a gas path therebetween, and the control law controls flow along the gas path. The processor comprises an output module, a plurality of temperature modules, a thermodynamic module, a comparator and an estimator. The output module generates an output signal as a function of a plurality of rotor and housing temperatures defined along the gas path, and the temperature modules determine time derivatives of the rotor and housing temperatures. The thermodynamic module models boundary conditions for the gas path, and the comparator determines errors in the boundary conditions. The estimator estimates the rotor and housing temperatures based on the time derivatives, such that the errors are minimized and the flow is controlled.

20 Claims, 10 Drawing Sheets

U.S. PATENT DOCUMENTS

| | | | | |
|---|---|---|---|---|
| 4,573,867 A * | 3/1986 | Hand | | 415/134 |
| 4,594,668 A * | 6/1986 | Fujawa et al. | | 701/100 |
| 4,604,701 A * | 8/1986 | Fujawa et al. | | 701/100 |
| 4,635,603 A * | 1/1987 | Hara | | 123/383 |
| 4,640,665 A | 2/1987 | Staroselsky et al. | | |
| 4,791,784 A * | 12/1988 | Minardi et al. | | 60/262 |
| 4,809,500 A | 3/1989 | Roberts, Jr. | | |
| 4,928,482 A | 5/1990 | Pollak et al. | | |
| 5,189,620 A | 2/1993 | Parsons et al. | | |
| 5,197,280 A | 3/1993 | Carpenter et al. | | |
| 5,212,943 A | 5/1993 | Harris | | |
| 5,303,142 A | 4/1994 | Parsons et al. | | |
| 5,331,806 A * | 7/1994 | Warkentin | | 60/39.465 |
| 5,444,971 A * | 8/1995 | Holenberger | | 60/783 |
| 5,448,881 A | 9/1995 | Patterson et al. | | |
| 5,533,329 A * | 7/1996 | Ohyama et al. | | 60/773 |
| 5,743,714 A | 4/1998 | Drob | | |
| 5,857,321 A * | 1/1999 | Rajamani et al. | | 701/100 |
| 6,016,465 A | 1/2000 | Kelly | | |
| 6,063,129 A | 5/2000 | Dadd et al. | | |
| 6,134,880 A * | 10/2000 | Yoshinaka | | 60/226.1 |
| 6,139,263 A * | 10/2000 | Klingels | | 415/173.5 |
| 6,364,602 B1 | 4/2002 | Andrew et al. | | |
| 6,379,108 B1 * | 4/2002 | Schmidt | | 415/1 |
| 6,393,355 B1 | 5/2002 | Muramatsu | | |
| 6,487,491 B1 * | 11/2002 | Karpman et al. | | 701/100 |
| 6,625,987 B2 | 9/2003 | Pisano et al. | | |
| 6,684,163 B2 * | 1/2004 | Antoine et al. | | 700/30 |
| 6,697,729 B2 * | 2/2004 | Wright | | 701/104 |
| 6,715,277 B2 | 4/2004 | Zagranski et al. | | |
| 6,725,847 B2 * | 4/2004 | Brunemann et al. | | 60/605.2 |
| 6,732,523 B2 * | 5/2004 | Birkner et al. | | 60/605.1 |
| 6,804,612 B2 * | 10/2004 | Chow et al. | | 700/29 |
| 6,823,253 B2 | 11/2004 | Brunell | | |
| 6,823,675 B2 | 11/2004 | Brunell et al. | | |
| 6,860,712 B2 | 3/2005 | Pisano et al. | | |
| 6,931,850 B2 * | 8/2005 | Frank et al. | | 60/608 |
| 7,089,738 B1 * | 8/2006 | Boewe et al. | | 60/605.2 |
| 7,136,738 B2 * | 11/2006 | Zagranski et al. | | 701/100 |
| 7,416,137 B2 * | 8/2008 | Hagen et al. | | 237/12.1 |
| 7,441,410 B2 * | 10/2008 | Kishibe et al. | | 60/772 |
| 7,472,100 B2 | 12/2008 | Volponi et al. | | |
| 7,621,716 B2 * | 11/2009 | Regunath | | 701/100 |
| 7,831,378 B2 * | 11/2010 | Wills | | 701/114 |
| 7,869,928 B2 * | 1/2011 | Hoff et al. | | 701/100 |
| 7,913,495 B2 * | 3/2011 | Kishibe et al. | | 60/772 |
| 7,934,368 B2 * | 5/2011 | Müller et al. | | 60/39.45 |
| 7,937,947 B2 * | 5/2011 | Kishibe et al. | | 60/772 |
| 7,966,868 B1 * | 6/2011 | Sonnichsen et al. | | 73/112.01 |
| 8,001,761 B2 * | 8/2011 | Myers et al. | | 60/39.281 |
| 8,050,843 B2 * | 11/2011 | von Hoff et al. | | 701/100 |
| 8,056,344 B2 * | 11/2011 | Remy et al. | | 60/776 |
| 2002/0143477 A1 * | 10/2002 | Antoine et al. | | 702/34 |
| 2002/0178730 A1 * | 12/2002 | Ganz et al. | | 60/773 |
| 2003/0083827 A1 * | 5/2003 | Chow et al. | | 702/34 |
| 2003/0094000 A1 | 5/2003 | Zagranski et al. | | |
| 2003/0191575 A1 * | 10/2003 | Wright | | 701/104 |
| 2003/0192516 A1 * | 10/2003 | Brunemann et al. | | 60/605.2 |
| 2004/0093151 A1 | 5/2004 | Zagranski et al. | | |
| 2004/0182373 A1 * | 9/2004 | Li et al. | | 123/568.12 |
| 2004/0238654 A1 * | 12/2004 | Hagen et al. | | 237/12.1 |
| 2005/0193739 A1 | 9/2005 | Brunell et al. | | |
| 2006/0051197 A1 * | 3/2006 | Regunath | | 415/1 |
| 2006/0207262 A1 * | 9/2006 | Firey | | 60/784 |
| 2006/0217870 A1 * | 9/2006 | Hoff et al. | | 701/100 |
| 2007/0234702 A1 * | 10/2007 | Hagen et al. | | 60/39.01 |
| 2007/0271927 A1 * | 11/2007 | Myers et al. | | 60/776 |
| 2008/0041065 A1 * | 2/2008 | Muller et al. | | 60/804 |
| 2009/0071166 A1 * | 3/2009 | Hagen et al. | | 60/775 |
| 2010/0017093 A1 * | 1/2010 | Mahmood | | 701/100 |
| 2010/0050628 A1 * | 3/2010 | Staffend et al. | | 60/508 |
| 2011/0000219 A1 * | 1/2011 | Myers et al. | | 60/776 |
| 2011/0014028 A1 * | 1/2011 | Wood et al. | | 415/1 |
| 2011/0077783 A1 | 3/2011 | Karpman et al. | | |
| 2011/0160980 A1 * | 6/2011 | von Hoff et al. | | 701/100 |
| 2011/0220516 A1 * | 9/2011 | Finfrock et al. | | 205/628 |
| 2011/0230981 A1 | 9/2011 | Karpman et al. | | |
| 2011/0231021 A1 | 9/2011 | Karpman et al. | | |

FOREIGN PATENT DOCUMENTS

WO     WO03/023538 A2     3/2003

* cited by examiner

HIGH FIDELITY INTEGRATED HEAT TRANSFER AND CLEARANCE IN COMPONENT-LEVEL DYNAMIC TURBINE SYSTEM CONTROL

STATEMENT OF GOVERNMENT INTEREST

This invention was in part produced through funding under a U.S. Government sponsored program (Contract No. N00019-02-C-3003, awarded by U.S. Navy) and the United States Government has certain rights therein.

CROSS-REFERENCE TO RELATED APPLICATION

This application is related to Boris Karpman et al., SYSTEM AND METHOD FOR DESIGN AND CONTROL OF ENGINEERING SYSTEMS UTILIZING COMPONENT-LEVEL DYNAMIC MATHEMATICAL MODEL, Ser. No. 12/264,014, filed Nov. 3, 2008. This application is also related to Boris Karpman et al., DESIGN AND CONTROL OF ENGINEERING SYSTEMS UTILIZING COMPONENT-LEVEL DYNAMIC MATHEMATICAL MODEL WITH MULTIPLE-INPUT MULTIPLE-OUTPUT ESTIMATOR, Ser. No. 12/475,020, and Boris Karpman et al., DESIGN AND CONTROL OF ENGINEERING SYSTEMS UTILIZING COMPONENT-LEVEL DYNAMIC MATHEMATICAL MODEL WITH SINGLE-INPUT SINGLE-OUTPUT ESTIMATOR, Ser. No. 12/475,038, each filed May 29, 2009. This application is further related to Boris Karpman et al., ROBUST FLOW PARAMETER MODEL FOR COMPONENT-LEVEL DYNAMIC TURBINE SYSTEM CONTROL, Ser. No. 12/552,711, filed on even date herewith.

BACKGROUND

This invention relates generally to the design and control of engineering systems. Across a broad range of industries, modern engineering systems are characterized by marked increases in complexity and simultaneous decreases in component tolerances. As a result, engineering control systems are subject to greater operational demands, which require more sophisticated and detailed modeling techniques.

Fluid-based engineering systems provide a range of relevant examples. These include gas turbine engines for aviation and power generation, HVAC&R (heating, ventilation, air-conditioning and refrigeration), fuel cells, and other, more generalized fluid processing systems for hydrocarbon extraction, materials processing, and manufacture. These systems contain any or all of the following components: turbo-machinery, fuel cell stacks, electric motors, pipes, ducts, valves, mixers, nozzles, heat exchangers, gears, chemical apparatuses and other devices for generating or modifying a fluid flow.

Each of these applications places different operational demands on the engineering control system. In gas turbine engines, for example, the relevant cycle is typically a Brayton turbine or first Ericsson cycle, and the basic thermodynamic parameters (or process variables) are the pressure, temperature and flow rate of the working fluid at the inlet, compressor, combustor, turbine, and exhaust. The parameters are related to the overall thrust, rotational energy, or other measure of power output. In order to precisely control this output while maintaining safe, reliable and efficient engine operation, the engineering control system should be fast, accurate and robust, and provide real-time control capability across a range of performance levels. While the relevant process variables vary depending on the system type and configuration, the need for precise, efficient and reliable engineering control remains the same, as do the economic constraints on overall cost and operational/maintenance requirements.

In the particular areas of turbine flow path analysis and clearance control, heat transfer between turbine components and the working fluid is an important aspect of system behavior. Specifically, tip clearance is related to heat transfer via the relative thermal expansion of adjacent turbine components, for example rotor and blade assemblies as compared to a turbine case or compressor housing, and stationary vanes as compared to a rotating shaft or hub.

With respect to flow path modeling and analysis, the relevant parameters are the pressure ratio, temperature and other flow parameters, as defined for a particular flow stream through a particular flow area (e.g., a fixed or variable nozzle area for working fluid flow, a bleed valve, or a fixed or variable-area orifice for cooling fluid flow). Existing models typically treat the complex phenomena of heat transfer and clearance separately, using independent sets of temperature and thermal growth states, and applying different analysis methods to operational states and calibration data. Existing flow parameter models, on the other hand, are often unstable under low-flow and choked-flow conditions. A more integrated and physics-based approach increases reliability and fidelity of these models, providing more efficient turbine system control over a wider range of conditions.

SUMMARY

This invention concerns a control system for a rotary apparatus such as compressor or a turbine, or for a gas turbine engine such as a turbofan. The rotary apparatus comprises a rotor and a housing, which form a gas path through the turbine. The control system comprises a processor and a control law for controlling flow along the gas path.

The processor includes an output module, a plurality of temperature modules, a thermodynamic module, a comparator and an estimator. The output module generates an output to direct the control law, as a function of rotor and housing temperatures defined along the gas path. The temperature modules determine time derivatives of the rotor and housing temperatures.

The thermodynamic module models boundary conditions for the gas path, and the comparator determines errors in the boundary conditions. The estimator estimates the rotor and housing temperatures based on the time derivatives, such that the errors are minimized and the flow is controlled along the gas path.

DETAILED DESCRIPTION

Figure 1:
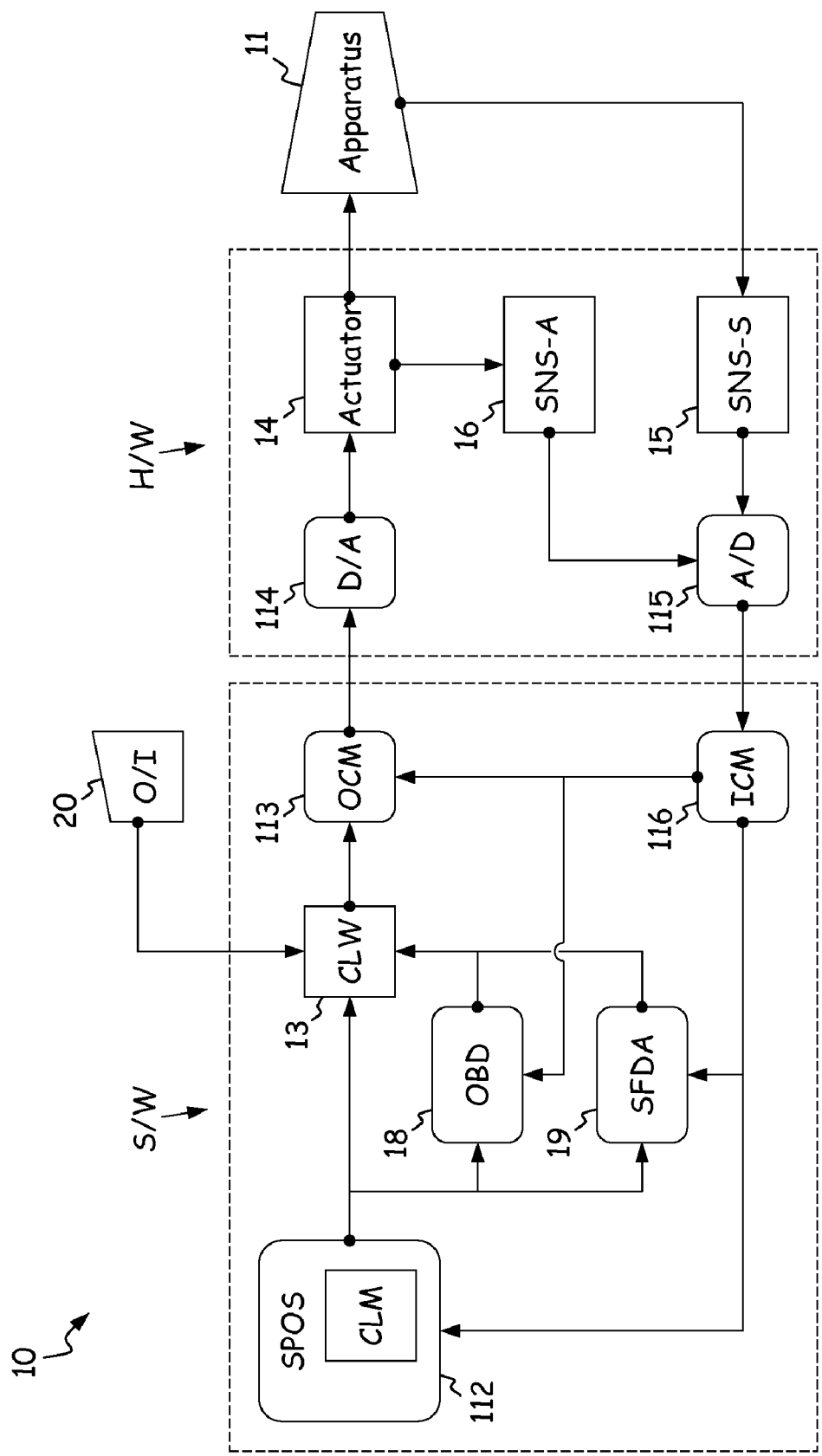
FIG. 1 is a schematic diagram of a control system with a closed-loop model processor and a discrete model state estimator.

FIG. 1 is a schematic diagram of digital control system 10 for apparatus 11. Control demands for apparatus 11 are generated by operator interface (I/F) 20, and satisfied by utilizing the components of system 10 to control apparatus (or engineering system) 11.

In general, system 10 includes at least some of the following software (S/W) modules: system parameter on-board synthesis (SPOS) module 112, control law (CLW) 13, on-board diagnostics (OBD) module 18, sensor fault detection and accommodation (SFDA) module 19, output conditioning module (OCM) 113, and input conditioning module (ICM) 116. These modules are incorporated in a "black box" type processor assembly mounted proximate apparatus 11, or in a number of individual processors. SPOS 112 is build around a component-level mathematical model of apparatus 11, also referred to as closed loop model (CLM) 12, such that CLM 12 is a subset of SPOS 112. System 10 also incorporates at least some of the following hardware (H/W) elements: digital-to-analog (D/A) converter 114, analog-to-digital (A/D) converter 115, actuator(s) 14, system sensor(s) 15, actuator sensor(s) 16.

As shown in FIG. 1, CLW 13 obtains control feedbacks from CLM 12/SPOS 112 and control commands (the desired values of outputs from apparatus 11) from operator interface (I/F) 20. CLW 13 generates control requests in engineering units, which are transformed into actuator requests compatible with D/A converter 114 by OCM 113. D/A converter 114 generates electrical signals that operate on actuators 14. Actuators 14 use control hardware to position various control elements of apparatus 11 in accordance with the control request, resulting in quick and accurate control of apparatus 11.

System sensors 15 measure operational parameters associated with apparatus 11. For example, fluid-based systems often include system sensors 15 that measure the working fluid pressure, temperature and flow at various axial and radial locations in the flow path. Actuator sensors 16 measure the state of actuators 14, where the actuator states (or positions) are related to the physical configuration of the various control elements in apparatus 11. For example, fluid-based systems often include actuators whose linear or angular positions are sensed by actuator sensors 16, and which are related to the physical position of control surfaces or other control devices located proximate a compressor, combustor, turbine or nozzle/exhaust assembly.

Sensor hardware modules 15 and 16 send electrical signals to A/D converter 115, which converts the electrical signals into a digital format compatible with the software and hardware architecture of control system 10. ICM 116 filters the raw signals and transforms them into engineering units compatible with the control system software architecture. In some embodiments, CLM 12 also communicates with CLW 13 via one or more SFDA module 19 and OBD module 18.

Apparatus 11 comprises an engineering system such as a gas turbine engine, an environmental control system or a fluid processing system. In various embodiments, the physical components of apparatus 11 include, but are not limited to, compressors, combustors, turbines, shafts, spools, fans, blowers, heat exchangers, burners, fuel cells, electric motors and generators, reactor vessels, storage vessels, fluid separators, pipes, ducts, valves, mixers and other fluid processing or flow control devices.

CLM 12 comprises elements designed to provide a component-level dynamic mathematical model of apparatus 11, utilizing a mixture of physics-based and data-derived descriptions of the individual physical components of apparatus 11. CLM 12 also models relationships among these components, including operational constraints based on physics and engineering considerations. That is, CLM 12 models not only the engineering components of apparatus 11, but also the physical laws that govern their behavior.

Operator I/F 20 comprises a real-time interface such as a cockpit navigation system or operator workstation. Alternatively, operator I/F 20 comprises another, more generalized process control interface, which is suitable for logging control commands to CLW 13.

CLW converts the control demands to control requests for actuators 14, which satisfy the control requests by changing the operational configuration of apparatus 11. Some actuators 14, for example, change the configuration of a fuel flow controller, a variable vane surface, or another control surface positioned along a fluid flow inside apparatus 11. Other actuators 14 change the state, position or configuration of additional devices for controlling the operation of apparatus 11, including, but not limited to, fuel pumps, variable compressor or turbine vanes, variable-area nozzle, inlet or bypass duct elements, and variable-area orifice elements.

System sensors 15 comprise a variety of different sensing devices, including, but not limited to, temperature sensors, pressure sensors, flow sensors, vibration sensors, debris sensors, current sensors, voltage sensors, level sensors, altitude sensors and blade tip sensors. System sensors 15 are positioned to measure operational parameters related to the function of apparatus 11, in particular as related to control commands submitted to CLW 13 and control requests generated by CLW 13, in order to direct actuators 14 to control apparatus 11.

In some embodiments, CLM 12 communicates with CLW 13 both directly and via one or more of OBD module 18 and SFDA module 19. Modules 18 and 19 monitor the state of system hardware including actuators 14, sensor modules 15 and 16, and apparatus 11. For example, the health of apparatus 11 and system sensors 15 is assessed based on a comparison of sensor values with the predictions of CLM 12. The health of actuators 14 and actuator sensors 16 is assessed based on the difference between requested and sensed actuator positions.

Under some conditions, OBD module 18 and SFDA module 19 allow CLW 13 to compensate for operationally-dependent changes in actuator response, including changes due to variations in temperature, pressure and power input or output. Modules 18 and 19 also utilize system parameters synthesized by CLM 12 to correct or recalibrate aberrant sensor signals, in order to provide more accurate and stable input to CLW 13. Alternatively, modules 18 and 19 replace failed sensor signals with synthesized values from CLM 12, or allow CLW 13 to deploy one actuator (or set of actuators) in order to compensate for another actuator (or set of actuators) that has failed. In these embodiments, SFDA module 19 typically generates a real-time alarm signal or other fault indicator, such as a fuel status warning, a damage report, a temperature alarm or a maintenance request.

Typically, apparatus 11 performs a thermodynamic cycle on a working fluid in order to generate rotational energy, electrical power or reactive thrust, to provide heating, ventilation, air conditioning and refrigeration, or to perform other fluid processing functions. The range of available cycles includes, but is not limited to, the following cycles and their derivatives: Otto cycles, Diesel cycles, Brayton turbine (or first Ericsson) cycles, Brayton jet (Barber/Joule) cycles, Bell-Coleman (reverse Brayton) cycles, Ericsson (second Ericsson) cycles, Lenoir (pulse-jet) cycles, and Carnot, Stoddard and Stirling cycles.

Alternatively, apparatus 11 performs a number of individual thermodynamic processes for heating, cooling, flow control, or for processing applications in agriculture, transportation, food and beverage production, pharmaceutical production, or manufacturing, or for the extraction, transportation or processing of a hydrocarbon fuel. The range of available thermodynamic processes includes, but is not limited to, adiabatic, isothermal, isobaric, isentropic, and isometric (isochoric or isovolumetric) transformations, exothermic reactions, endothermic reactions and phase changes.

In operation of system 10, CLW 13 receives a control command from real-time operator I/F 20, and a control feedback or model output from CLM 12. The control command is related to the operation of apparatus 11, and the feedback is related to the control command. In one embodiment, for example, apparatus 11 comprises a gas turbine engine, and the command comprises an operator-generated demand for increased engine power or thrust output. Alternatively, the request is automatically generated by system 10, or by another control system, in response to changing ambient conditions or operational demands.

Control signals are transmitted in either digital or analog form, depending upon the characteristics of control system 10. For example, CLW 13 typically generates a digital control request in engineering units. OCM 113 converts the digital request into units compatible with D/A converter 114, which in turn generates an electrical signal such as voltage or current for actuator 14. Typical examples include analog voltage signals for a fuel pump, analog current signals for a valve controller, and pulsed digital signals for a stepper motor or other mechanical actuator. The actuator is attached to a variable-position control device located within apparatus 11, such as a variable-position blocker door for a bypass duct, a variable-position vane, or a variable-geometry exhaust nozzle. Compound signals are sometimes utilized for more complex actuator systems, such as fuel, oxidant and cooling fluid flows through a thrust augmentor/afterburner assembly, counter-rotating fan thrust and attitude control signals for STOVL (short takeoff or vertical landing) operations, or flow management through a regenerator, heat exchanger, reaction vessel, catalytic converter or other component of a fluid processing system.

Actuators 14 address the control request by manipulating or adjusting one or more control devices (or control elements) within apparatus 11. Apparatus 11 responds to the action of actuators 14, such that the control command provided to CLW 13 is satisfied. For the case of a gas turbine, these manipulations take a variety of forms, including changes in the fuel flow or other fluid flow rate, changes in vane, bypass duct or nozzle configurations, and other changes in the configuration of apparatus 11. The typical responses of apparatus 11 include an increase or decrease in total thrust or power output, changes in a cooling flow or fluid processing rate, and on/off switching of supplementary systems such as counter-rotating fans, regenerators and heat exchangers.

System sensors 15 sense parameters related to the operation of apparatus 11. In particular, these parameters are related to the control requests raised by CLW 13, and the response of actuators 14. Typical sensor parameters include, but are not limited to, positions, velocities, acceleration, currents, and voltages, rotational speeds of spools or shafts, fuel flow rates, working fluid flow rates, power input, power output, and pressures and temperatures proximate various components of apparatus 11, such as inlets, outlets, compressors, combustors, turbines, exhaust systems, reaction or storage vessels and flow conduits. Additional sensors such as altimeters, air speed indicators or accelerometers are sometimes utilized to determine higher-order operational parameters such as thrust, climb or Mach number. In some embodiments, these higher-order parameters are directly measured by a particular sensor or sensor group. In other embodiments, including virtual sensor embodiments, higher-order parameters are calculated as a function of lower-order (directly measured) parameters.

The conditions of actuators 14 and apparatus 11 are represented by sensors 15 and 16 in software form, and made available to any of CLM 12, CLW 13, OBD 18 and SFDA 19 via ICM 16, providing an accurate assessment of the control influences acting on apparatus 11. In the case of an increased thrust request for a gas turbine engine, for example, CLM 12 directs CLW 13 to control actuators 14 in order to increase the fuel flow rate, and to change the position of various vane and nozzle components along the working fluid flow path through apparatus 11. Apparatus 11 responds with faster spool rotation, higher flow and increased exhaust temperature and pressure, which is sensed by system sensors 15 and reflected by synthesized system parameters generated by CLM 12.

In operation of system 10, CLW receives control demands from operator I/F 20 and converts them into control requests for OCM 113, as described above. CLM 12 directs CLW 13 to dynamically adjust the control requests as a function of feedback or model output that represents the real-time operational condition of apparatus 11. The feedback signals include operational parameters related to specific control commands, such as commands related to shaft speeds and fuel flow rates. This allows system 10 to satisfy each control demand and control request quickly and accurately, without overshooting or oscillating about the target value. In some embodiments, CLM 12 also generates diagnostic and fault outputs for OBD 18 and SFDA 19.

System 10 and CLM 12 provide fast, accurate and robust response to real-time control commands. In particular, CLM 12 utilizes nonlinear functions to provide faster convergence and lower response time than other, highly iterative techniques, or that rely on linear, piecewise linear and "lightly" non-linear estimates, rather than fully non-linear state variable functions. This allows system 10 to provide greater operating efficiency, particularly when apparatus 11 is subject to highly variable loads and unstable operational configurations.

In general, CLM 12 is comprised within a "black-box" processor mounted proximate apparatus 11, as described above. CLM 12 communicates with CLW 13, system sensors 15, actuator sensors 16 and the other elements of system 10, as shown in FIG. 1, and estimates model states non-iteratively, with execution speed sufficient to provide stable and responsive control of apparatus 11.

In gas turbine engine embodiments, system 10 is applicable to a range of FADEC (full authority digital engine control) or "fly-by-wire" aviation applications, including STOVL operations for high-performance military aircraft. In these embodiments, apparatus 11 typically comprises a low-bypass turbofan engine having a core flow length on the order of a few meters. In further embodiments, the turbofan is configured for afterburning operations, and operates under conditions of choked inlet flow and substantially transonic or sonic core flow.

Figure 2:
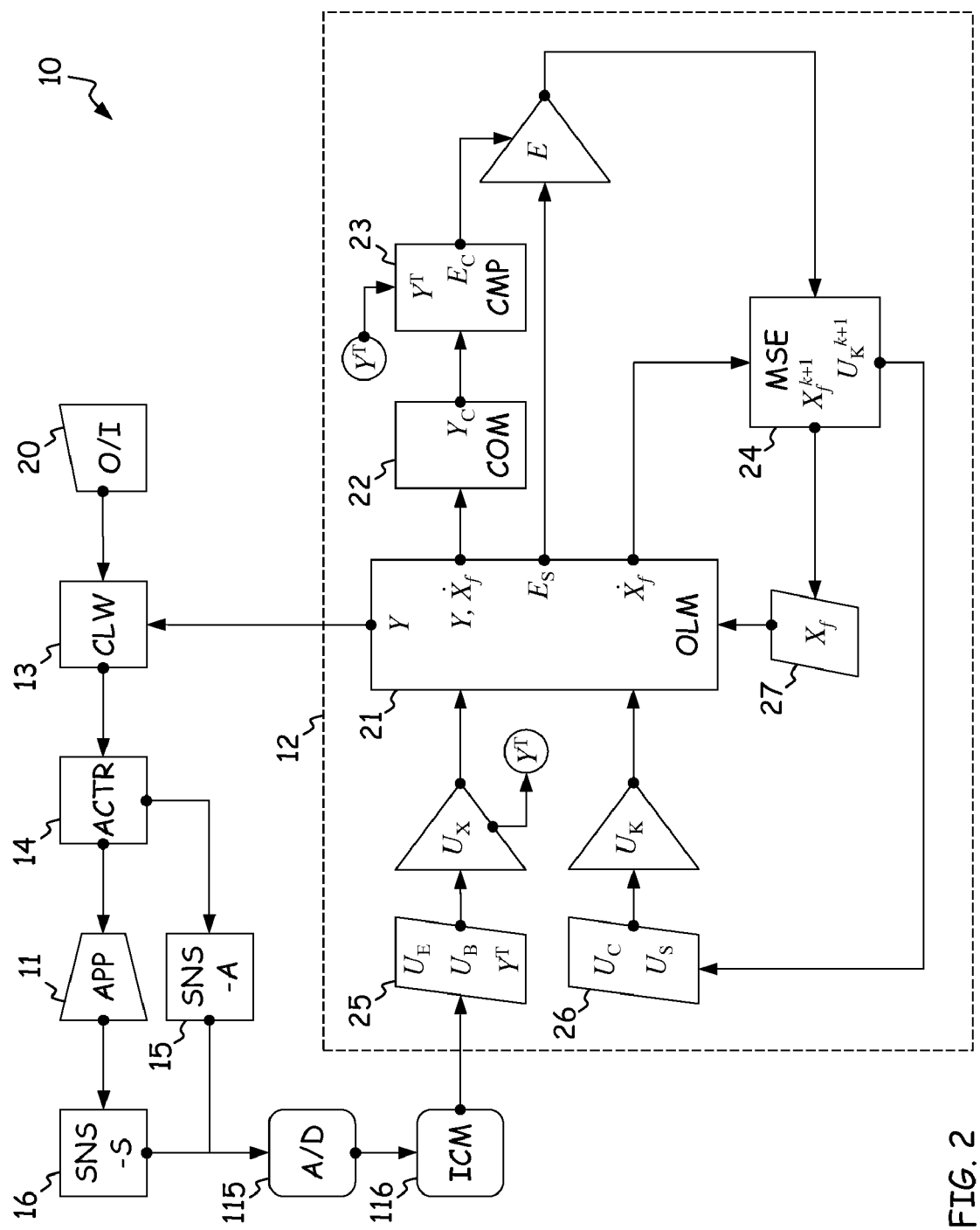
FIG. 2 is a schematic diagram showing the model processor of FIG. 1.

FIG. 2 is a schematic diagram of CLM 12 for control system 10. CLM 12 comprises a number of modular software elements, including open-loop module (OLM) 21, corrector output module (COM) 22, comparator module (CMP) 23 and model state estimator (MSE) 24. These elements operate in concert to provide system 10 with fast, accurate and stable control of apparatus 11.

Closed-loop model 12 receives external inputs 25 from sensor modules 15 and 16, via the A/D converter 115 and ICM 116. Inputs 25 comprise effector vector $U_E$, truth vector $Y_T$ and boundary conditions $U_B$, which are combined to form external input vector $U_X$.

Effector vector $U_E$ describes the configurations, positions and states of various control elements in apparatus 11. In a gas turbine engine, for example, individual elements of effector vector $U_E$ describe fuel flow rates, nozzle areas, variable vane angles, flow path orifice areas, and other control element parameters.

In real-time execution of control system 10, truth vector $Y_T$ describes the actual (sensed) values of parameters related to the operation of apparatus 11. The elements of truth vector $Y_T$ are based on measurements by sensors 15 and 16, or, alternatively, a well-understood and trusted model of sensed parameters, such as a flow rate model based on a differential pressure drop across a Pitot tube or Venturi tube. For gas turbine engines, typical truth vector elements describe spool speeds and gas path temperatures or pressures proximate engine components such as compressors, combustors and turbines. In the context of non-real time applications, including calibration, truth vector $Y_T$ corresponds to high fidelity data which can either be physical tested or is model-based.

The elements of boundary vector $U_B$ describe boundary conditions related to the operation of apparatus 11. Some boundary conditions are directly measured by system sensors 15, such as fluid temperatures, pressures and flow rates at physical boundaries of apparatus 11. In fluid-based applications, the boundary conditions include boundary flow conditions at inlet and outlet locations. Other boundary conditions specific to aircraft applications include, but are not limited to, flight velocity, altitude, and bleed or power extractions parameters.

In addition to external inputs 25, OLM 21 also operates on states of CLM 12. These states include two major subsets, which are referred to as constraint input states 26 ($U_K$) and physics states 27 ($X_f$). Constraint input states 26 ($U_K$) comprise corrector subset $U_C$ and solver subset $U_S$. Constraint corrector states $U_C$ are used to correct subset $Y_C$ of outputs Y, and constraint solver states $U_S$ are used to minimize solver errors $E_S$. Physics states 27 ($X_f$) comprise a subset of dynamic states of apparatus 11, whose elements are determined based on their impact on the dynamic fidelity of CLM 12. Physics states 27 ($X_f$) typically exhibit relatively slow dynamics with respect to the execution speed of CLM 12, which is limited by the digital control system hardware (that is, the capability of the "black box" processor or other computing platform).

Compared to physics states $X_f$, constraint input states $U_K$ are generally characterized by a faster time scale, for example the time scale associated with inter-component fluid volumes in a gas turbine engine or other fluid processing system. In particular, the latency time for elements of constraint input states $U_K$ is by definition less than the execution speed of CLM 12, outside the dynamic range of physics states $X_f$, and does not affect the fidelity of model outputs from CLM 12 that impact the quality of control system 10.

Constraint corrector states $U_C$ form a vector of adjustable model parameters utilized to correct a subset of model outputs $Y_C$ from COM 22, such that they match corresponding elements of truth vector $Y_T$. The model parameters include both physics and engineering considerations, and empirical relationships based on actual operating conditions. Corrector outputs $Y_C$ and truth vector $Y_T$ are compared within a particular tolerance defined by comparator (CMP) 23, which outputs the difference by generating error corrector vector $E_C$. Corrector errors $E_C$ are combined with solver errors $E_S$ to produce error vector E. Essentially, CLM 12 seeks constraint vector $U_K$ that drives both subsets of error vector E to zero.

Constraint solver states $U_S$ impose both system and component constraints on CLM 12. In contrast to physics states $X_f$, these constraints often, but not always, are based on physical laws of flow continuity, thermodynamics, and other engineering limitations. This also contrasts with constraint corrector states $U_C$, which are model-adjustable parameters meant to compensate for incorrectly modeled and/or omitted physics phenomena, and not always based on physics and engineering principles.

In the case of gas turbine-based systems, the elements of physics state vector $X_f$ describe "important" states such as spool speeds, which directly affect the transient fidelity of the CLM 12 through their direct impact on outputs corresponding to control commands such as thrust commands. There is also a subset of physics states $X_f$ that is not directly sensed, but nevertheless is modeled in CLM 12, such as metal temperatures along a hot gas flowpath. The relatively long response time for physics model states $X_f$ contrasts with the relatively short latency time of constraint corrector states $U_C$ and corrector outputs $Y_C$, which correspond to faster dynamical variables including flowpath temperatures and pressures.

Additional outputs Y do not necessarily correspond to parameters that are directly measured or controlled, for example gas path parameters in locations where it would be difficult, expensive or dangerous to place physical sensor devices. Further outputs Y are generalized outputs, which do not necessarily correspond to any particular physical quantity at all. Some generalized outputs are nonetheless empirically useful as inputs to CLW 13, because they allow system 10 to more quickly and accurately satisfy particular control commands.

OLM 21 also generates physics state vector derivatives defined by:

$$\dot{X}_f \equiv \frac{dX_f}{dt}, \qquad [1]$$

as well as solver error vector $E_S$. Physics state vector derivatives $\dot{X}_f$ model the time rates of change of physics state vectors $X_f$, which are generated by model state estimator 24, below. Solver errors $E_S$ are most often associated with constraint solver states $U_S$ via physics and engineering-based constraints, including energy conservation, mass conservation and flow continuity. COM 22 forms corrector output vector $Y_C$, as a subset of output vector Y and physics state vector derivatives $\dot{X}_f$ from OLM 21. The elements of corrector output vector $Y_C$ correspond to particular elements of truth vector $Y_T$.

CMP 23 compares $Y_C$ to the corresponding elements of truth vector $Y_T$, generating corrector errors $E_C$. Corrector errors $E_C$ are combined with solver errors $E_S$ to generate error vector E, which is minimized via MSE 24. Model parameters from OLM 21 are adjusted by corrector vector $U_C$ in order to minimize the difference between corrector outputs $Y_C$ and truth vector $Y^T$, reducing errors between the output of CLM 12 and the actual condition of apparatus 11, as sensed by system sensors 15 and actuator sensors 16.

CLM 12 operates in both an on-board or online mode for real-time control of apparatus 11, and an off-board or offline mode. Off-board applications include system plant representation in control hardware testing environments, transient and steady state simulations to support design activities for system 10 and apparatus 11, and off-board hardware diagnostics to support field maintenance activities. Consequently, the particular pairing of constraint corrector states $U_C$ and corrector outputs $Y_C$ depends upon whether system 10 is operating in on-board or off-board mode. In particular, on-board and off-board sensor configurations often vary. Corrector subset $Y_C$ of model output vector Y varies accordingly, in order to compare with the appropriate suite of sensors corresponding to truth vector $Y_T$.

As defined above, MSE 24 synthesizes physics state vector $X_f$ and constraint input state vector $U_K$ from error vector E and physics state vector derivative $\dot{X}_f$. Specifically, MSE 24 advances vectors $X_f$ and $U_K$ by the CLM cycle time, producing time-advanced physics state vector $X_f^{k+1}$ and time-advanced constraint input state vector $U_K^{k+1}$. The time-advanced vectors are fed back into OLM 21, completing the closed-loop structure of CLM 12.

Vectors $X_f$ and $U_K$ provide complementary utility. Constraint input state vector $U_K$ allows CLM 12 to explicitly predict the elements of state vector $X_f$ in a feed-through (non-iterative) fashion, and to converge on time-advanced physics state vector $X_f^{k+1}$ within a reasonable processing time. This provides a high fidelity model that accurately represents engineering system/apparatus 11, so that control system 10 operates in a reliable, efficient and effective manner.

In general, MSE 24 seeks time-advanced vectors $X_f^{k+1}$ and $U_K^{k+1}$ that minimize error vector E (that is, drive the error toward zero). Typically, MSE 24 also minimizes physics state vector derivative $\dot{X}_f$. Thus MSE 24 generates outputs that minimize its inputs, such that CLM 12 more accurately describes the physical condition of apparatus 11, and such that CLW 13 more quickly, accurately and reliably satisfies the control commands raised by operator I/F 20.

OLM 21 performs a non-iterative (single-pass or feed-through) analysis, in order to generate Y, $\dot{X}_f$ and $E_S$ on a short time scale appropriate for a range of highly responsive dynamical embodiments of apparatus 11. In general, vectors $\dot{X}_f$, E and Y are functions of vectors $X_f$, $U_X$ and $U_K$; that is, $$\dot{X}f = f_1(U_X, U_K, X_f), \quad [2]$$

$$E = f_2(U_X, U_K, X_f), \quad [3]$$

and $$Y = f_3(U_X, U_K, X_f), \quad [4]$$

where vector Y is the output (or feedback) from CLM 12. Feedback vector Y is used by CLW 13 to direct actuators 14 to position various control elements of apparatus 11, in order to achieve desired behavior. In a fluid based system such as gas-turbine engine, for example, the desired result is safe and efficient steady state and transient operation, which satisfies operational requirements for aircraft propulsion or power generation.

While vectors $U_X$, $U_K$, $X_f$, E and Y perform different functions within CLM 12, in some cases the individual vector elements are related. In particular, for some elements of output vector Y, transformation function $f_3$ takes on a relatively simple one-to-one form, such that output vector Y comprises one or more elements of physics state vector $X_f$. Alternatively, output vector Y is a function of one or more elements of external input vector $U_X$. This allows CLM 12 to perform additional fidelity checks based on truth vector $Y_T$, as described above and below.

MSE 24 generates time-advanced physics state vector $X_f^{k+1}$ and time-advanced constraint input state vector $U_K^{k+1}$ in order to minimize error vector E, physics state vector derivative $\dot{X}_f$, or both. In particular, vector $X_f^{k+1}$ is directed toward minimization of state vector derivative $\dot{X}_f$, and vector $U_K^{k+1}$ is directed toward minimization of error vector E. Furthermore, vector $U_C^{k+1}$ is directed toward minimization of corrector error vector $E_C$, and vector $U_S^{k+1}$ is directed toward minimization of solver error vector $E_S$.

Since vector $X_f$ typically has relatively slow dynamic response with respect to the execution speed of CLM 12, the time-advanced form ($X_f^{k+1}$) can be estimated using an appropriate numerical approximation such as the forward rectangle rule. That is, $$X_f^{k+1} = X_f + f_4(X_f, U_X, U_C) \times \Delta T, \quad [5]$$

where $\Delta T$ is the step time.

A more general result, without assuming any particular numerical integration algorithm, is:

$$X_f^{k+1} = X_f + f_5(X_f, \dot{X}_f, X_f^{k-1}, \dot{X}_f^{k-1} \ldots), \quad [6]$$

where the "k−1" superscript denotes time-retarded forms of state vector $X_f$ and state vector derivative $\dot{X}_f$; that is, forms derived in a finite number of previous executions of CLM 12. The ellipses indicate that any number of additionally retarded forms can be utilized.

The additional requirements imposed on vector $U_K$ make the determination of time-advanced form $U_K^{k+1}$ a difficult technical problem. The process is best described by considering a small region around a particular operational point or base point BP, where a linear representation holds to sufficient accuracy. In this region, changes (or differences) in external input vector $U_X$, constraint state vector $U_K$ and physics state vector $X_f$ are defined by:

$$\Delta U_X \equiv U_X - U_X|_{BP}, \quad [7]$$

$$\Delta U_K \equiv U_K - U_K|_{BP}, \quad [8]$$

and $$\Delta X_f \equiv X_f - X_f|_{BP}, \quad [9]$$

where the "$|_{BP}$" subscript indicates evaluation at the location of base point BP.

In a linear approximation, the differences in physics state vector derivative $\dot{X}_f$, error vector E and output vector Y are linear combinations of the differences in vectors $X_f$, $U_X$ and $U_X$. That is, $$\Delta \dot{X}_f \approx A_f^f \cdot \Delta X_f + A_k^f \cdot \Delta U_K + A_x^f \cdot \Delta U_X, \quad [10]$$

$$\Delta E \approx A_f^e \cdot \Delta X_f + A_k^e \cdot \Delta U_K + A_x^e \cdot \Delta U_X, \quad [11]$$

and $$\Delta Y \approx A_f^{y} \cdot \Delta X_f + A_k^{y} \cdot \Delta U_K + A_x^{y} \cdot \Delta U_X. \quad [12]$$

Note that Eqs. 10-12 utilize a generalized tensor form, in which the product of tensors $A^i_j$ and vectors $X_f$, $U_K$ and $U_X$ tend to mix or cross-couple contributions from different vector elements. This contrasts with Eqs. 2-6, which are vector equations in which particular scalar functions $f_1$-$f_5$ are applied to individual components of vectors $X_f$, $\dot{X}_f$, E and Y. Eqs. 7-9 are similarly interpretable in terms of individual vector elements.

In linear models, the change in constraint vector $U_K$ can be explicitly calculated, for example by setting the change in the error vector ($\Delta$E) in Eq. 11 to zero. Provided that the inverse of tensor $A^e_k$ is sufficiently definable over the relevant parameter space, this yields:

$$\Delta U_K \approx -[A_k^e]^{-1}(A_f^e \cdot \Delta X_f + A_x^e \cdot \Delta U_X). \quad [13]$$

For some embodiments of apparatus 11, the number of parameters is relatively small and constraint vector $U_K$ can be directly approximated as a nonlinear function of state vector $X_f$ and input vector $U_X$. For many practical engineering systems, however, the complexity of apparatus 11 limits applicability of Eq. 13. The accuracy of linear representations also decreases with distance from base point BP, and the required execution speed is often impractical because the computational load increases exponentially.

In larger-scale practical engineering systems where the model cycle time (the step size) must be increased to keep up with the processing rate of apparatus 11, nonlinearities must be addressed in a more sophisticated way, which does not yield an impractical processing load. This is accomplished via a combined feed-forward and feedback-based approach to error correction, where feed-forward term $F_F$ is based on time-advanced state vector $X_f^{k+1}$ and time-advanced external input vector $U_X^{k+1}$, and feedback term $F_B$ includes contributions from the accumulated error. That is, $$U_K^{k+1} = U_K^{k+1}|_{BP} + F_F(X_f^{k+1}, U_X^{k+1}) + F_B(\Delta U_K, E, \int E dt), \quad [14]$$

where error integral $\int E \, dt$ is performed over a number of control system time steps. The more general approach of Eq. 14 allows CLM 12 and MSE 24 to address non-linear couplings among the various elements of input vector $U_X$, state vector $X_f$ and error vector E, which affect constraint vector $U_K$ and thus determine overall performance.

Figure 3:
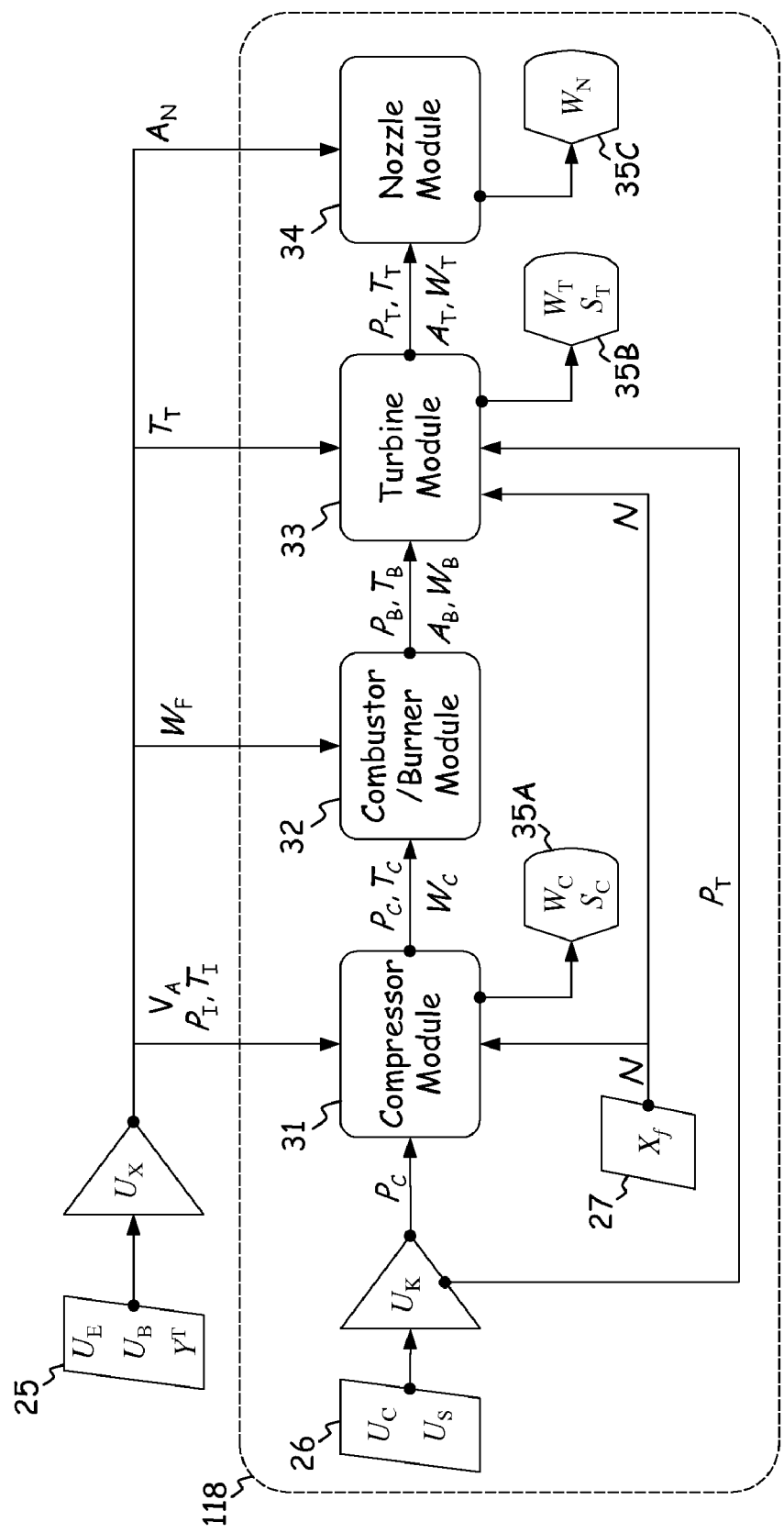
FIG. 3 is a schematic diagram showing the model processor of FIG. 1, as applied to a single-spool turbojet engine.

FIG. 3 is a schematic diagram showing the application of OLM subset (OLS) 118 to a single-spool gas turbine engine, as an exemplary embodiment of apparatus 11 in FIG. 1. OLS 118 comprises a subset of the control functions of OLM 21 as shown in FIG. 2, above, including distinct modeling and control modules corresponding to a number of physical engine components. In the particular embodiment of FIG. 3, for example, OLS 118 comprises compressor module 31, combustor/burner module 32, turbine module 33 and exhaust nozzle module 34. In other embodiments, OLS 118 comprises additional component modules for different turbine, turbojet or turbofan elements, including, but not limited to, coaxially nested spools, inlets, outlets, nozzles, a turbofan, a reduction gearbox, an augmentor assembly and a forward fan for SVTOL operation.

As shown in FIG. 3, external inputs 25 describe a number of actuator-based and sensor based parameters that are variously categorized as elements of effector vector (or actuator vector) $U_E$, boundary condition vector $U_B$, or truth vector $Y_T$. Some of these categorizations overlap. At compressor module 31, for example, inputs 25 include elements of effector vector $U_E$ that describe vane angle $V_A$ and other variable inlet parameters, and elements of boundary condition vector $U_B$ describe inlet pressure $P_I$ and inlet temperature $T_I$, where the inlet forms an external flow boundary upstream of the compressor. For combustor module 32 and turbine module 33, inputs 25 include components of truth vector $Y_T$ that describe turbine exhaust case (TEC) or turbine exit temperature $T_T$. For nozzle module 34, inputs 25 include elements of actuator vector $U_E$ that describe nozzle area $A_N$ and other variable nozzle parameters.

As described above, constraint input states 26 comprise vectors $U_C$ and $U_S$, which are combined to form constraint input state vector $U_K$. In FIG. 3, for example, vector $U_K$ includes component-specific elements such as compressor outlet pressure $P_C$, as determined at an intermediate location between the compressor corresponding to software module 31, and the combustor corresponding to software module 32. Additional constraint vector components are generated within downstream component modules, for example TEC pressure or turbine exit pressure $P_T$, as determined within a transition flow duct between the physical turbine corresponding to software module 33 and the physical exhaust nozzle corresponding to software module 34.

In the example of FIG. 3, physics state vector 27 ($X_f$) contains an element corresponding to shaft speed N. Shaft speed N is utilized by compressor module 31 and turbine module 33, in order to calculate corresponding module outputs for the model. As with other elements of physics state vector $X_f$, shaft speed N is determined by engineering principles, has relatively slow response time compared to the model time step, and reflects system dynamics that are accurately modeled by OLS 118.

The change in spool speed N depends upon the net power delivered to the shaft:

$$\frac{dN}{dt} = \frac{S_T - S_C}{N \times I}, \quad [15]$$

where $S_T$ and $S_C$ are the power output from turbine module 33 and the power input to compressor module 31, respectively, and I is the moment of inertia of the shaft or spool.

Component modules 31, 33 and 34 produce model outputs 35A, 35B and 35C, which are a representative subset of the model outputs used to form relationships between vectors $X_f$ and $\dot{X}_f$, and between vectors $U_K$ and E. Compressor module output 35A, for example, includes compressor flow rate $W_C$ and power demand $S_C$. Turbine module output 35B includes turbine flow rate $W_T$ and power output $S_T$, and nozzle output 35C includes nozzle flow rate $W_N$. Additional outputs include various gas path temperatures, gas path pressures and specific corrector outputs $Y_C$, such as turbine exit temperature $T_T$. Corrector outputs $Y_C$ are compared to specific elements of truth vector $Y_T$, in order to generate errors (specifically, corrector errors $E_C$), and OLS 118 reduces the errors to enhance model fidelity and response.

The elements of constraint vector $U_K$ are divided into constraint corrector states $U_C$, which are utilized to correct subset $Y_C$ of outputs Y (that is, to minimize corrector error $E_r$), and constraint solver states $U_S$, which are used to minimize solver errors $E_S$. Vector $U_C$ includes adjustable (empirical) parameters, while constraint solvers $U_S$ are based on established rules of engineering and essentially inviolable laws of physics.

Applying control volume mass conservation law, it can be shown that the time rate of change in turbine module 33 exit pressure $P_T$, for example, depends upon ideal gas constant R, temperature $T_T$ and rate of flow into ($W_T$) and out of ($W_N$) volume $V_T$, as defined between the physical turbine and nozzle components corresponding to software modules 33 and 34, respectively:

$$\frac{dP_T}{dt} = \frac{RT_T}{V_T} \times (W_T - W_N). \quad [16]$$

Eq. 16 also related to the error in turbine flow:

$$E_S(W_T) = \frac{RT_T}{V_T} \times (W_T - W_N). \quad [17]$$

In general, corrector errors $E_C$ depend upon the difference between the elements of corrector output vector $Y_C$ and the corresponding elements of truth vector $Y_r$. For turbine temperature $T_T$, for example, the appropriate element is:

$$E_C(T_T) = Y_C(T_T) - Y_T(T_T). \quad [18]$$

That is, the corrector error element corresponding to temperature $T_T$ is the difference between the turbine exit temperature as modeled by turbine module 33, and the corresponding element of truth vector $Y_T$. Depending on application, this element is sometimes an actual measurement from a physical sensor located in the core flow proximate the turbine exit assembly, and sometimes a high fidelity model output, which is accepted as accurate.

In general, particular constraint state parameters are utilized in a number of different forms, including both physics engineering relationships and empirical associations, in order to minimize error corrector $E_C$ and error solver $E_S$. Further, Eqs. 16-18 are not limited in application to the turbine/nozzle interface, but can be applied to any control volume at any flow transition, including transitions between the physical components corresponding to compressor module 31, combustor/burner module 32 and turbine module 33, or between an exhaust nozzle and an augmentor or afterburner assembly. At the same time, changes in one constraint parameter will necessarily influence a number of different errors, state vectors and model outputs. This makes stable error correction a high priority for fast, accurate and robust modeling and control systems.

Figure 4:
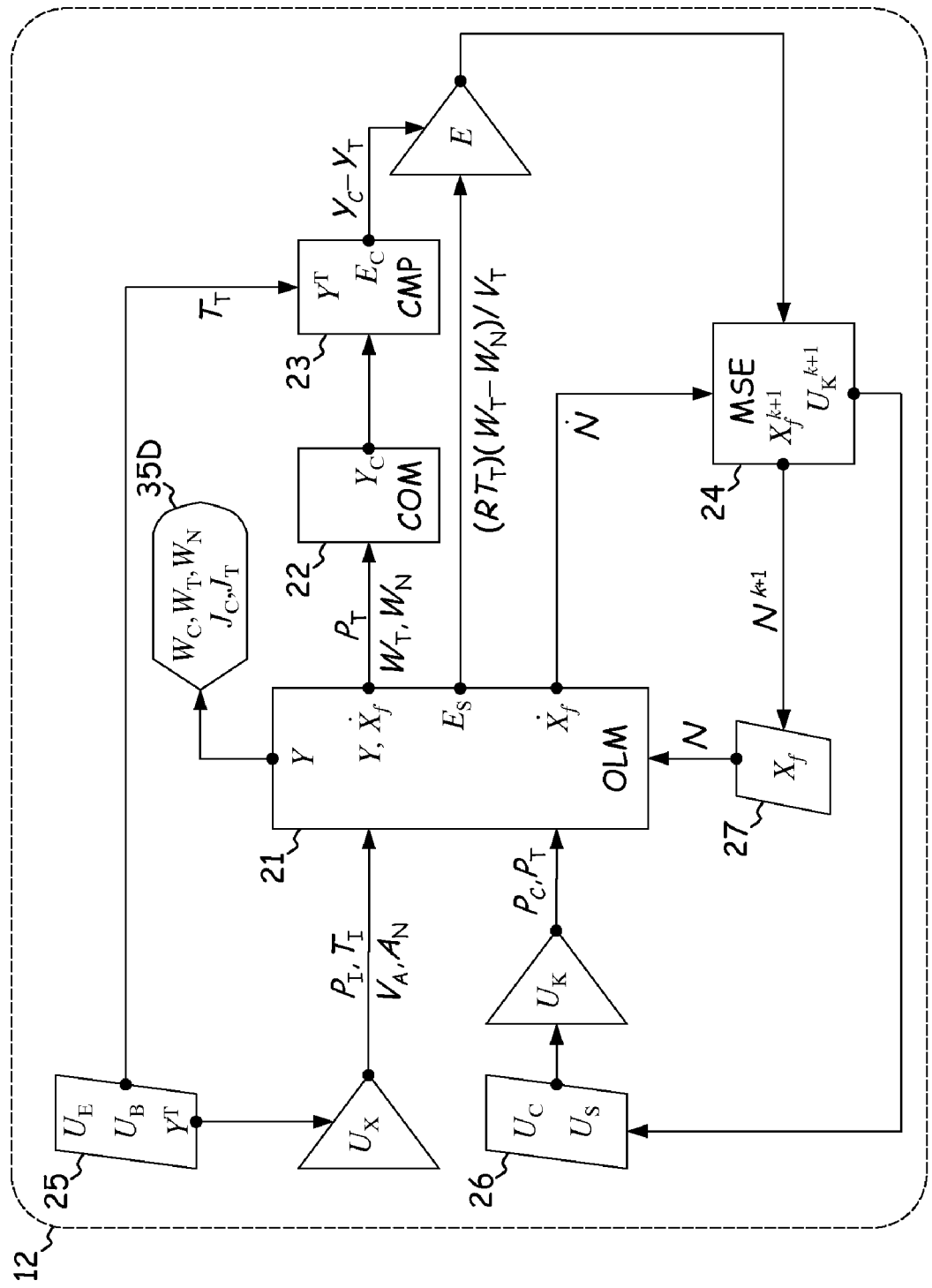
FIG. 4 is a schematic diagram illustrating an error minimization mechanism for the model processor of FIG. 1.

FIG. 4 is a schematic diagram illustrating an error minimization mechanism for CLM 12. CLM 12 is processor-based model comprising OLM 21 with subset OLS 118, COM 22, CMP 23 and MSE 24, as described above. CLM 12 operates on inputs 25 and generates outputs 35D, which combine modular outputs 35A, 35B and 35C of FIG. 3.

As shown in FIG. 4, inputs 25 to CLM 12 describe boundary conditions such as inlet pressure $P_I$ and inlet temperature $T_I$, and control states of apparatus 11, such as variable vane and nozzle configurations $V_A$ and $A_N$. These are input directly to OLM 21, while truth states such as turbine exit temperature $T_T$ are also input to CMP 23.

Typically, the inputs to OLM 21 are delivered to one or more individual component-level software modules, such as compressor module 31, combustor/burner module 32, turbine module 33 and exhaust nozzle module 34 of FIG. 3, above. In turn, each of the component-level software modules utilizes processor components that perform the module-level functions of OLM 21, COM 22, CMP 23 and MSE 24.

Constraints 26 comprise vectors $U_C$ and $U_S$, which are combined to form vector $U_K$. Constraint state vector $U_K$ includes component-specific elements such as compressor outlet pressure $P_C$, as determined at an intermediate location between the compressor and combustor. Additional constraint vector components are generated by downstream component modules, for example turbine exit pressure $P_T$, as determined within a transition flow duct between the turbine section and the exhaust nozzle.

The elements of constraint vector $U_K$ describe component-specific elements such as compressor outlet pressure $P_C$ and turbine outlet pressure $P_T$. Constraint correctors $U_C$ are utilized to improve the accuracy of corrector outputs (modeled values) $Y_C$ at COM 22, which correspond to truth (measured or high fidelity modeled) values $Y_T$, for instance the "true" value of turbine exit temperature $T_T$. This minimizes corrector errors $E_C$, as determined by CMP 23. Constraint solver states $U_S$ are utilized to minimize solver errors $E_S$, including the error in turbine flow parameters as described above.

Physics state vector 27 ($X_f$) comprises elements describing physics states of the apparatus, including spool speed N. OLM 21 determines the time rate of change in spool speed ($\dot{N}$) and other state vector elements, based on physics and engineering principles such as moment of inertia and net power delivered to the shaft.

Model state estimator (MSE) 24 generates time-advanced physics state vector $X_f^{k+1}$ and time-advanced constraint vector $U_K^{k+1}$ for feedback into OLM 21, such that state vector derivatives $\dot{X}_f$ and error vector E are driven toward zero (that is, minimized). This allows CLM 12 to quickly, accurately and reliably model the physical apparatus, ensuring fast response and high fidelity control.

In order to achieve these goals, MSE 24 must predict (or estimate) future model state values with some degree of accuracy, in order to reduce the magnitude of error vector E. In particular, MSE 24 must be able to accurately formulate the feedback term $F_B$ in Eq. 14, and must employ a gain design scheme that addresses cross-dependencies among the different elements of constraint vector $U_K$ and error vector E.

There are two basic approaches to gain design, depending upon how strong the cross-dependencies are. In the single-input, single-output (SISO) approach, distinct elements of error vector E are closely associated with distinct elements of constraint vector $U_K$, and not substantially cross-correlated, so gain formulation can be decoupled for each individual element. In the multiple-input, multiple-output (MIMO) approach, error vector E and constraint vector $U_K$ are substantially cross-correlated with one another, and the problem is not decoupled. The MIMO approach is further divided into control and observer formulations, as described below.

The SISO approach applies when distinct components of error vector E are closely associated or paired with distinct components of constraint vector $U_K$. In this case, tensors $A^i_j$ in Eqs. 10-12 take on substantially diagonal form, with relatively small-magnitude off-diagonal elements. Alternatively, the SISO approach applies when there is one-way coupling. In this case, tensors $A^i_j$ have substantially triangular form, in which the elements on one side of the diagonal are zero, or at least small as compared to elements on the other side of the diagonal.

In SISO embodiments, the feedback contribution in Eq. 14 is approximated by the following single-input, single-output model state estimator equation:

$$U_K^{k+1} = U_K^{k+1}|_{BP} + S(X_f, U_X, U_K, Y) \cdot E \times \Delta T. \quad [19]$$

Essentially, Eq. 19 provides a difference equation (or a set of difference equations) for obtaining time-advanced constraint vector $U_K^{k+1}$. The difference equations define the change in time-advanced constraint vector $U_K^{k+1}$ from its value at base point BP, in terms of the tensor product of gain matrix S and error vector E, scaled by time step ΔT.

In the decoupled case, gain tensor S is substantially diagonal; that is, each element of time-advanced constraint vector $U_K^{k+1}$ is associated with exactly one element of error vector E, and is not closely associated with the others. In this case, the estimation process for time-advanced constraint state vector $U_K^{k+1}$ is simply repeated for each set of paired elements. Because the mapping from constraint vector $U_K^{k+1}$ to error vector E is substantially one-to-one, the computations are independent and can be performed in any order.

CLM 12 utilizes non-linear approximations, such that the particular form of gain tensor S varies as a nonlinear function of input vectors $X_f$, $U_X$, $U_K$ and Y. In addition, the gain design process is repeated over a rich set of inputs, representing the full operational envelope of each individual vector element. The elements of gain tensor S are then determined on the basis of model fidelity, control response, and stability over the entire operational range.

During the gain design process, additional correlations typically appear between elements of constraint vector $U_K$ and elements of error vector E. To the extent that these additional cross-couplings are small, the SISO estimator approach holds and it is sufficient to approximate gain tensor S with a substantially diagonal or substantially triangular form. To the extent that these additional cross-couplings are not small, the SISO approximation does not hold and multiple-input, multiple-output (MIMO) design approach is employed.

In the MIMO embodiment, MSE 24 utilizes a twofold design approach in which a linear analysis is used to formulate initial gain parameters (that is, to estimate the gain tensor elements), followed by derivation of a model state estimator difference equation analogous to Eq. 19, above, but using a gain integral to accommodate additional cross-couplings. There are two basic approaches to the MIMO gain design equation, which are known as control formulation and observer formulation.

In the control formulation approach, the elements of error vector E are assumed to depend upon the time derivative of an unknown state vector $X_d$. That is, $$\Delta E = \Delta \frac{dX_d}{dt}, \quad [20]$$

where unknown state vector $X_d$ is also referred to as the solution state vector. The solution state vector derivative is $$\dot{X}_d \equiv \frac{dX_d}{dt}, \quad [21]$$

which is analogous to the definition of state vector derivative $\dot{X}_f$, above. Augmented state vector X includes both known (or predefined) physics state vector $X_f$ and additional unknown (MSE-defined) components $X_d$:

$$X \equiv \begin{bmatrix} X_f \\ X_d \end{bmatrix}. \quad [22]$$

The control formulation views constraint vector $U_K$ as a control input. The change in $U_K$ depends upon augmented state vector X through a multiple-input, multiple-output (MIMO) gain function, which is expressed in matrix form as gain tensor M. That is, $$\Delta U_K = -M \cdot \Delta X, \quad [23]$$

where M is the MIMO gain tensor in the control formulation. Note that this approach also requires augmentation of constraint vector $U_K$ and MIMO gain tensor M, for example $$M = \lfloor M_f M_d \rfloor,$$

where submatrices $M_f$ and $M_d$ are associated with physical state vector $X_f$ and solution vector $X_d$, respectively.

Gain design seeks gain tensor M that allows MSE 24 to direct solution state vector $X_d$ toward quick and reliable minimization of error vector E, which in turn achieves stability and fidelity for CLM 12 and facilitates stable and accurate control response for system 10. A general form for estimating time-advanced (augmented) state vector $X^{k+1}$ is based on the forward rectangular rule for integral approximation:

$$\Delta X^{k+1} = \Delta X + \dot{X} \times \Delta T. \quad [25]$$

In this expression, the augmented state vector derivative $$\dot{X} \equiv \frac{dX}{dt} \quad [26]$$

is determined by functions of external input vector $U_X$, constraint vector $U_K$, state vector $X_f$ and solution states $X_d$. That is, $$\Delta \dot{X} = \begin{bmatrix} f_1(U_X, U_K, X_f) \\ f_2(U_X, U_K, X_f) \end{bmatrix}. \quad [27]$$

MIMO gain tensor M is defined as a function of the time rate of change in the augmented state vector:

$$\dot{X} = \left[ \begin{bmatrix} A_f^f & 0 \\ A_d^f & 0 \end{bmatrix} - \begin{bmatrix} A_f^d \\ A_d^d \end{bmatrix} \cdot [M_f \ M_d] \right] \cdot \Delta X + B \cdot \Delta U_x, \quad [28]$$

where the first term defines dynamic matrix A:

$$A \equiv \begin{bmatrix} A_f^f & 0 \\ A_d^f & 0 \end{bmatrix} - \begin{bmatrix} A_f^d \\ A_d^d \end{bmatrix} \cdot [M_f \ M_d]. \quad [29]$$

Gain tensor M is sized to place eigenvalues of dynamic matrix A in order to meet the overall stability and transient fidelity requirements of CLM 12. Essentially, dynamic matrix A concerns the physical, engineering, empirical and other dynamical relationships that determine time derivative of augmented state vector X, and gain tensor M determines the appropriate gain or multiplicative factor to be applied to each relationship.

Time-advanced constraint vector $U_K^{k+1}$ is defined analogously:

$$\Delta U_K^{k+1} = -M \cdot \Delta X^{k+1}. \quad [30]$$

In some embodiments, solution states $X_d$ are decoupled from physical states $X_f$, such that the solution vector and physical state vector are well separated in terms of the bandwidth (the respective bounds in the frequency domain) In these embodiments, independent forms are obtained for solution states $X_d$:

$$\Delta X_d^{k+1} = \Delta X_d + \frac{dX_d}{dt} \times \Delta T, \qquad [31]$$

$$\Delta \dot{X}_d = f_d(U_X, U_K, X_f), \qquad [32]$$

and $$\Delta U_k^{k+1} = -M_d \cdot \Delta X_d^{k+1}. \qquad [33]$$

Eqs. 31-33 are directly programmable into CLM processor 12, in order to produce control formulation-based model state estimation.

In the observer formulation approach, an assumption is made that constraint vector $U_K$ is the unknown or solution state $X_d$, and that its time derivative is zero. That is, $$\Delta U_K = \Delta X_d \qquad [34]$$

and $$\Delta \dot{U}_K = 0. \qquad [35]$$

Applying linear observer methodology, the following estimator is constructed to drive error vector E to zero:

$$\begin{bmatrix} \Delta \dot{X}_f \\ \Delta \dot{X}_d \end{bmatrix} = \begin{bmatrix} A_f^f & A_c^f \\ 0 & 0 \end{bmatrix} \cdot \begin{bmatrix} \Delta X_f \\ \Delta X_d \end{bmatrix} + \begin{bmatrix} B_f^x \\ 0 \end{bmatrix} \cdot \Delta U_X - \begin{bmatrix} L_f \\ L_d \end{bmatrix} \cdot E, \qquad [36]$$

where $L_f$ and $L_d$ are the sub-matrices of gain tensor L in the MIMO observer formulation. In augmented form, this is:

$$\Delta \dot{X} = A \cdot \Delta X + B \cdot \Delta U_X - L \cdot E, \qquad [37]$$

or, in gain design form:

$$\begin{bmatrix} \Delta \dot{X}_f \\ \Delta \dot{X}_d \end{bmatrix} = \qquad [38]$$

$$\left\{ \begin{bmatrix} A_f^f & A_c^f \\ 0 & 0 \end{bmatrix} - L \cdot \begin{bmatrix} A_d^f & A_d^c \end{bmatrix} \right\} \cdot \begin{bmatrix} \Delta X_f \\ \Delta X_d \end{bmatrix} + \left\{ \begin{bmatrix} B_x^f \\ 0 \end{bmatrix} - L \cdot B_x^d \right\} \cdot \Delta U_X,$$

where the first term in curly braces is the dynamic tensor. Gain tensor L is sized to place eigenvalues of the dynamic tensor in order to meet the overall stability and transient fidelity requirements of CLM 12.

The resulting difference equations for augmented state vector X are:

$$\Delta X^{k+1} = \Delta X + \Delta \dot{X} \times \Delta T, \qquad [39]$$

as above, and $$\begin{bmatrix} \Delta \dot{X}_f \\ \Delta \dot{X}_d \end{bmatrix} = \begin{bmatrix} f_1(U_X, U_K, X_f) \\ 0 \end{bmatrix} - \begin{bmatrix} L_f \\ L_d \end{bmatrix} \cdot f_2(U_X, U_K, X_f). \qquad [40]$$

When the physics states are excluded from the observer formulation, solution vector $X_d$ decouples in the model state estimator difference equation. This yields:

$$\Delta X_d^{k+1} = \Delta X_d - L_d \cdot f_2(U_X, U_K, X_f) \times \Delta T \qquad [41]$$

and $$\Delta \dot{X} = -L_d \cdot f_2(U_X, U_K, X_f). \qquad [42]$$

Again, Eqs. 39-42 are directly programmable into CLM processor 12, in the observer-based embodiment of MIMO model state estimation.

Figure 5:
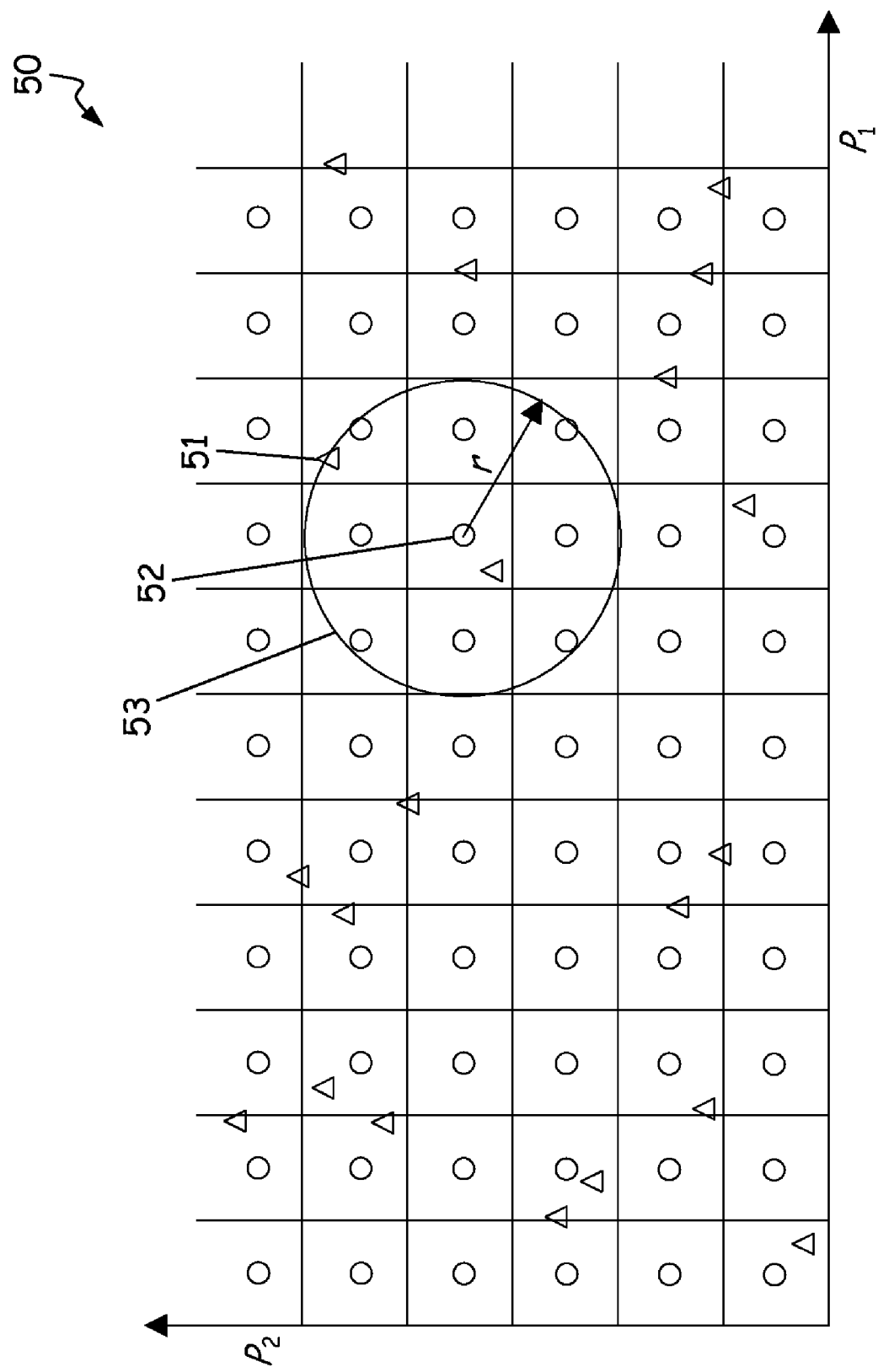
FIG. 5 is a two-dimensional plot of scheduling parameters, illustrating gain design processes for the model processor of FIG. 1.

FIG. 5 is a two-dimensional plot (50) of scheduling parameters $P_1$ and $P_2$, illustrating the gain design process. Gain design comprises a number of steps, including, but not limited to: selecting an optimum set of scheduling parameters, defining a data set, synthesizing an optimum base point system, linearization, scaling, and gain sizing.

Optimum scheduling parameters are determined on the basis of unique criteria including base point field coverage, independence, surface smoothness, variability validity, and gain margin statistics. The criteria are evaluated both with respect to the gain parameters themselves, and with respect to vector derivatives such as $dE/dU_K$.

Typical candidate scheduling parameters include elements of external input vector $U_X$, constraint vector $U_K$, state vector $X_f$, output vector Y or error vector E that sufficiently define the apparatus to allow effective gain scheduling. Alternatively, the scheduling parameters incorporate elements of augmented vectors such as augmented state vector X, or other parameters not contained in the augmented vectors, but which nonetheless provide for effective gain scheduling.

Plot 50 illustrates a bi-variant or two-dimensional approach with two arbitrary scheduling parameters $P_1$ and $P_2$, plotted against each other with first parameter $P_1$ on the horizontal and second parameter $P_2$ on the vertical. Typically, engineering complexity requires at least two scheduling parameters, and no more than two parameters are used when sufficient to effectively design the gain, in order to reduce computational requirements. Alternatively, a one-dimensional (univariant) approach is used, or a multi-variant (multi-dimensional) approach.

Scheduling parameters $P_1$ and $P_2$ are defined for steady state and transient operational conditions spanning a rich data set of design, off-design and failure conditions. A linear space representation is obtained at each design point, applying various linearization techniques to accurately predict system behavior in the vicinity of each data point 51 (triangles). Linearization is verified by a step-response time domain analysis or other validation process, which is applied to a subset of the design data points.

Linear system variables are scaled by maximum values, to improve accuracy of numerical tensor operations during gain design. Correcting linear system variables improves effectiveness of MSE, when operating at non-standard boundary conditions. Scaled and corrected linear models are then used in the gain design process.

The linear representation and gain size vary between points of the design data set. An optimum base point system is synthesized, where each base point 52 (circles) contains a complete specification of the linear system. The operating envelope is covered by a finite number of base points, each defined with scheduling parameters $P_1$ and $P_2$, or another set of scheduling parameters. This results in a rectangular grid of base points 52, forming a base point field than spans the relevant scheduling parameter range.

A linear state space representation is synthesized at each base point 52, from a finite number of design data points located in close proximity to the base point. Proximity is defined by base point cloud 53, with radius r selected as an optimization parameter. One approach utilizes a weighted average of data points 51 located within base point cloud 53.

The weighting factor is defined, for example, as a function of the non-dimensional distance between base point 52 and data point 51.

The gain is sized for each system of base points 52, and the discrete model state estimator obtains values of the gain at each time step by interpolating between the base points. That is, the field of optimized base points 52 provides a "lookup table" from which the gains can be interpolated, so that the elements of gain matrices S, M and L can be rapidly and effectively determined as functions of scheduling parameters $P_1$ and $P_2$.

Figure 6:
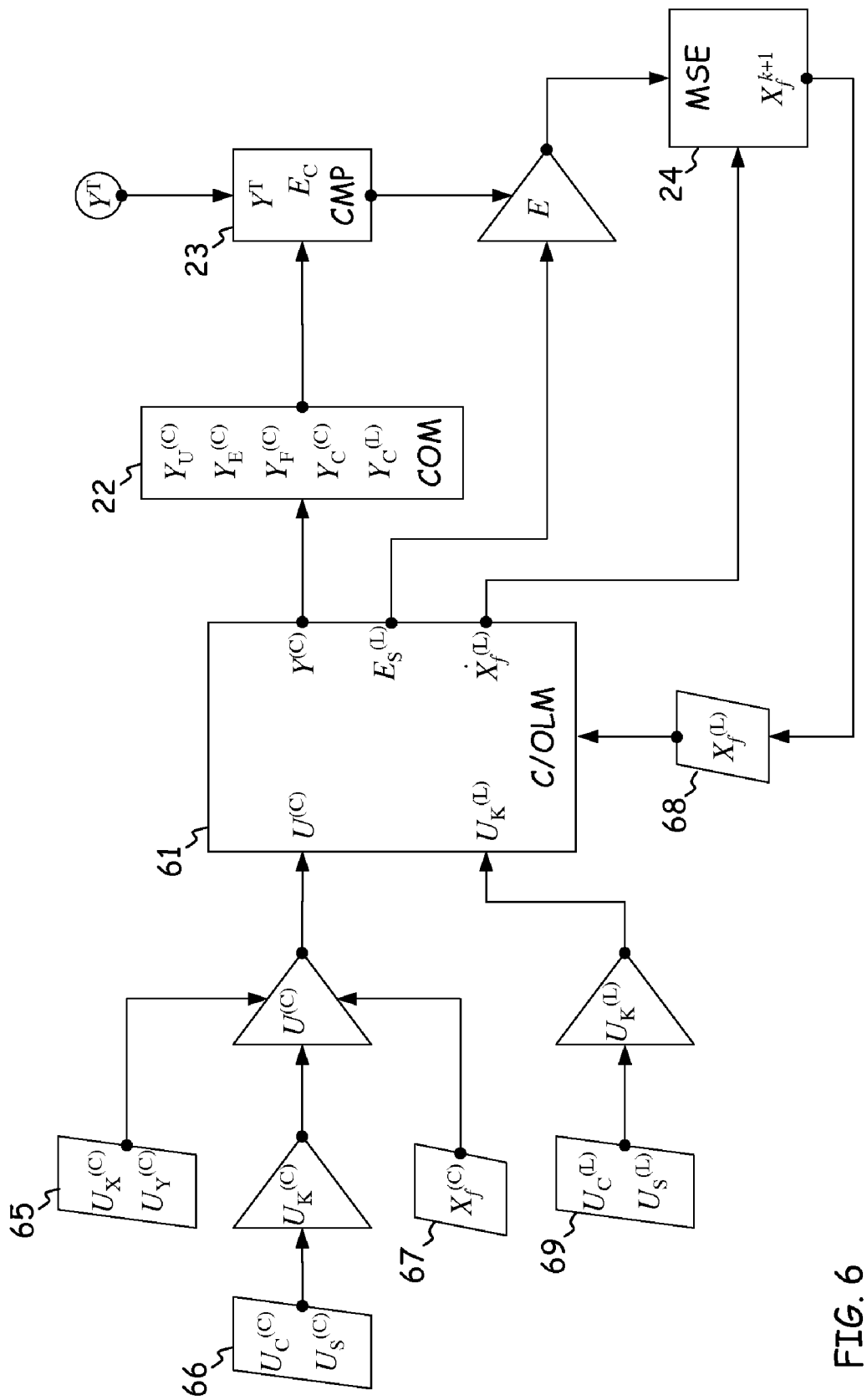
FIG. 6 is a schematic diagram illustrating generic component-level architecture for the model processor of FIG. 2.

FIG. 6 is a schematic diagram illustrating generic component-level architecture for open-loop module processing as described above with respect to FIG. 2. As shown in FIG. 6, component-level OLM processor (C/OLM) 61 utilizes component-level input $U^{(C)}$ and local constraints $U_K^{(L)}$ in order to model local state vector $X_f^{(L)}$ and generate component-level output $Y^{(C)}$.

Component-level input $U^{(C)}$ comprises external inputs 65, component-level constraints 66 and component-level physics states 67. External inputs 65 include a subset of external input vector $U_X$ in which particular elements $U_X^{(C)}$ are specifically relevant to C/OLM processor 61, as well as particular elements $U_Y^{(C)}$ of the output from other (for example, upstream) C/OLM processors. Component-level constraint inputs 66 comprise subset $U_K^{(C)}$ of constraint vector $U_K$, including specific elements $U_C^{(C)}$ of corrector state vector $U_C$ and specific elements $U_S^{(C)}$ of solver state vector $U_S$.

Component-level physics states 67 include those elements $X_f^{(C)}$ of physics state vector $X_f$ that are relevant to C/OLM processor 61. Note, however, that derivatives $\dot{X}_f^{(C)}$ of component-level input states $X_f^{(C)}$ are calculated externally to C/OLM 61, while local physics states 68 have derivatives $\dot{X}_f^{(L)}$ that depend on local states $X_f^{(L)}$ and are calculated by C/OLM processor 61. Similarly, local constraints 69 include a particular subset $U_S^{(L)}$ of solver state vector $U_S$, for which local solver elements $E_S^{(L)}$ of error vector $E^{(L)}$ are calculated locally via C/OLM 61, and local elements $U_C^{(L)}$ of corrector state vector $U_C$ correspond to off-board correction inputs that are locally associated with C/OLM 61.

Corrector output module (COM) 22 and comparator module (CMP) 23 are global-level rather than component-level modeling elements. COM 22 and CMP 23 thus generate global error vector E, as described above with respect to FIGS. 2 and 4, including both local (component-level) elements $E^{(L)}$ and other, non-local errors. Model state estimator (MSE) 24 is also a global-level modeling element, which estimates time-advanced (k+1) forms for both local states $X_f^{(L)}$ and other, non-local elements of state vector $X_f$.

Component-level output $Y^{(C)}$ of C/OLM 61 has a number of different subsets. These include subset $Y_U^{(C)}$, which serves as input to other component-level OLMs; subsets $Y_E^{(C)}$ and $Y_F^{(C)}$, used in formulating externally-calculated subsets of error vector E and physics state vector derivatives $\dot{X}_f$, respectively.

Subset $Y_C^{(C)}$ of component-level output $Y^{(C)}$ is used in forming OLM corrector vector $E_C$, while local corrector subset $Y_C^{(L)}$ is used in forming off-board correction error $E_C^{(L)}$, for example by comparing to local subset $Y^{T(L)}$ of truth vector $Y^T$. Thus the generic component architecture closely resembles the OLM architecture of FIG. 2, above, and the design process for particular components is similar, as described immediately below.

Figure 7:
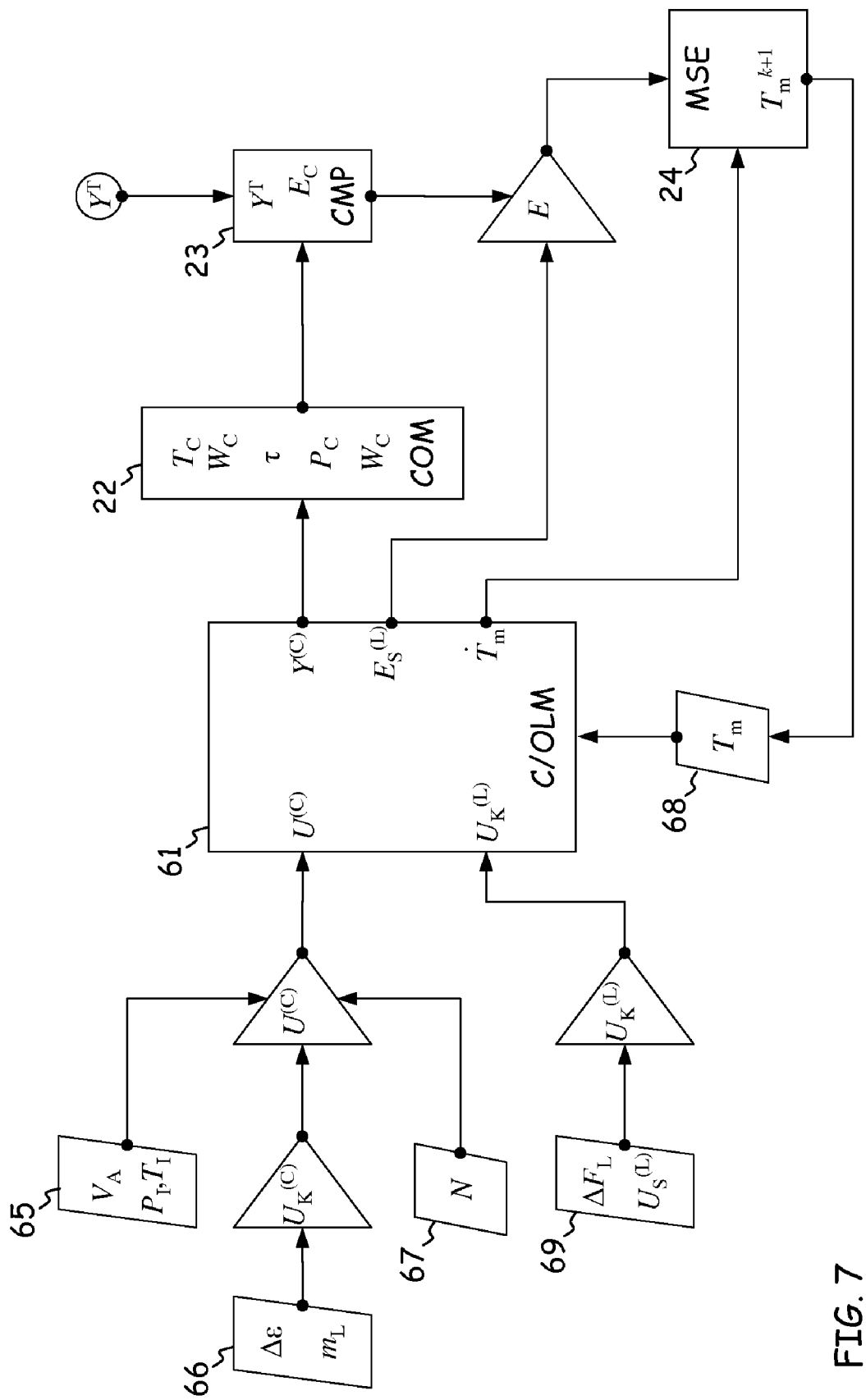
FIG. 7 is a schematic diagram illustrating the component-level architecture of FIG. 6, as applied to an axial-flow compressor.

FIG. 7 is a schematic diagram illustrating the component-level architecture of FIG. 6, as applied to an axial-flow compressor interface. In this example, relevant variables and operational parameters are substituted into the generic input/output structure of FIG. 6, in order to show how the generic architecture is applied to a specific rotary fluid processing apparatus.

With respect to component-level inputs $U^{(C)}$, external inputs 65 typically include vane angle $V_A$, an element of external input vector $U_X^{(C)}$, and particular flow station input parameters such as inlet temperatures and pressures $T_I$ and $P_I$, or functions thereof. The flow station parameters are elements of $U_Y^{(C)}$, and generated as output by another (e.g., upstream) OLM process. Typical component-level constraint inputs 66 include the variation in compressor efficiency (48) from its base (map) value, as represented in component-level corrector state subset $U_C^{(C)}$, and compressor map line ("m-Line") $m_L$, as represented in component-level solver state subset $U_S^{(C)}$ of solver state vector $U_S$. Essentially, $m_L$ is an independent modeling and control variable utilized to provide superior convergence characteristics in particular compressor map applications, including a variety of gas turbine engine configurations.

In the axial-flow compressor example of FIG. 7, the relevant component-level input states 67 include shaft speed N. Thus the shaft speed is an element of $X_f^{(C)}$, but note that shaft speed derivative $\dot{N}$ is externally calculated. Local physics states 68, on the other hand, include lumped metal temperatures $T_m$ (e.g., for blades, vanes, and rotor or housing components). Metal temperatures $T_m$ are elements of $X_f^{(L)}$, and have locally-calculated derivatives $\dot{T}_m$. Local constraints 69, finally, include variations in the flow ($\Delta F_L$) relative to the base map value, as represented in local correct state subset $U_C^{(L)}$ of corrector state vector $U_C$, and other local elements $U_S^{(L)}$ of solver state vector $U_S$.

Figure 8A:
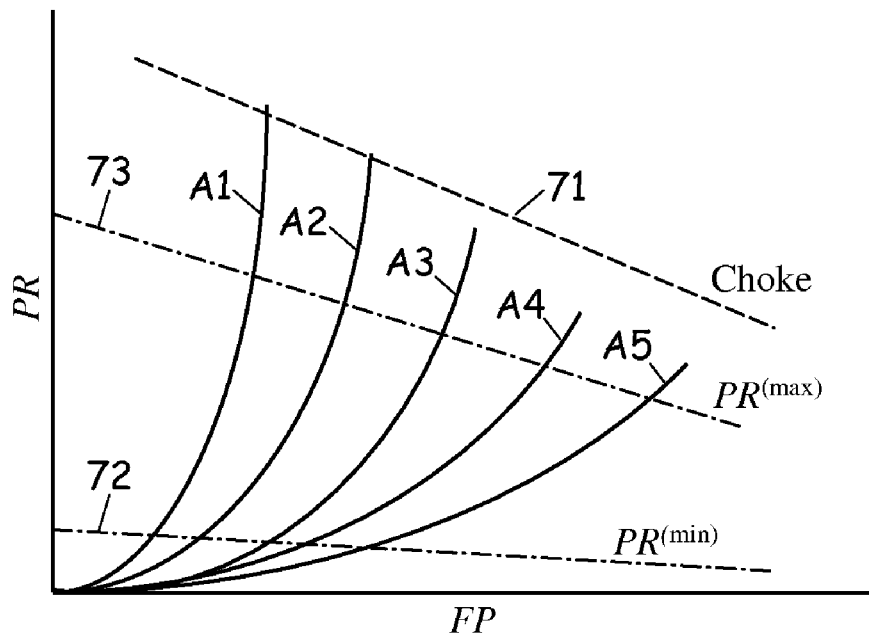
FIG. 8A is a flow parameter map, illustrating the relationship between pressure ratio and flow parameter for various flow duct areas.

FIG. 8A is a flow parameter map, illustrating the relationship between pressure ratio PR and flow parameter FP for a variable area flow regulation device. Pressure ratio PR is defined as the ratio of upstream to downstream pressure across the flow area A (that is, the aperture size), and is plotted on the vertical axis. Flow parameter FP is a function of the flow through area A and is plotted on the horizontal, resulting in a family of curves of the form PR=ƒ(FP,A) for each flow area A1, A2, A3, A4 and A5.

Flow parameter analysis originates from compressible flow theory, as applied to a component-level mathematical model of a gas turbine system. In the particular embodiment of FIG. 8A, for example, flow parameter FP is defined as follows:

$$FP = \frac{W}{P}\sqrt{T}, \qquad [43]$$

where mass flow W, pressure P and temperature T are defined for the flow area, for example upstream or downstream of the flow aperture. Typical examples are bleed flow, in which compressed air flows from a higher pressure region to a lower pressure region through a bleed orifice; nozzle flow, in which high pressure, high velocity combustion gas expands to static conditions in an ambient reservoir; and flow regulation, in which a variable area restriction is placed in the gas stream in order to generate a loss in pressure.

Depending on component-level architecture and overall control scheme, FIG. 8A can equivalently be interpreted as a map of pressure ratio PR based on flow parameter FP, or as a map of flow parameter FP based on pressure ratio PR, where the mapping is individually applicable to each flow curve A1-A5, with any area A. Flow curves A1-A5 each approach the region of choked flow in a different map location (e.g., as defined along choke line 71), and each curve has a different "well behaved" modeling range. This range is determined in the region above zero flow (i.e., where FP=0), and below choked flow (i.e., choke line 71), between minimum and maximum flow parameters FP as defined by $PR^{(min)}$ line 72 and $PR^{(max)}$ line 73, respectively.

In the choked flow region above $PR^{(max)}$, the slope of the flow curve tends to diverge (that is, the inverse slope approaches zero), and relatively small changes in flow parameter FP correlate with relatively large changes in pressure ratio PR. Similarly, in the low-flow region below $PR^{(min)}$, the slope of the flow curve approaches zero (that is, the inverse slope diverges), and relatively small changes in pressure ratio PR correlate with relatively large changes in flow parameter FP.

Both situations can lead to instabilities, and present substantial challenges to the discrete solver approach to gas turbine system control. In choked flow conditions, moreover (e.g., above $PR^{(max)}$ line 73 and approaching choke line 71), pressure ratio PR cannot always be independently determined from flow parameter FP. A separate solution state is thus necessary when operating in the choked region, such that a feed-through FP calculation is not always possible. A carefully constructed solution state, active only in the choked region, is required to ensure smooth transitions between the choked and un-choked regions.

Figure 8B:
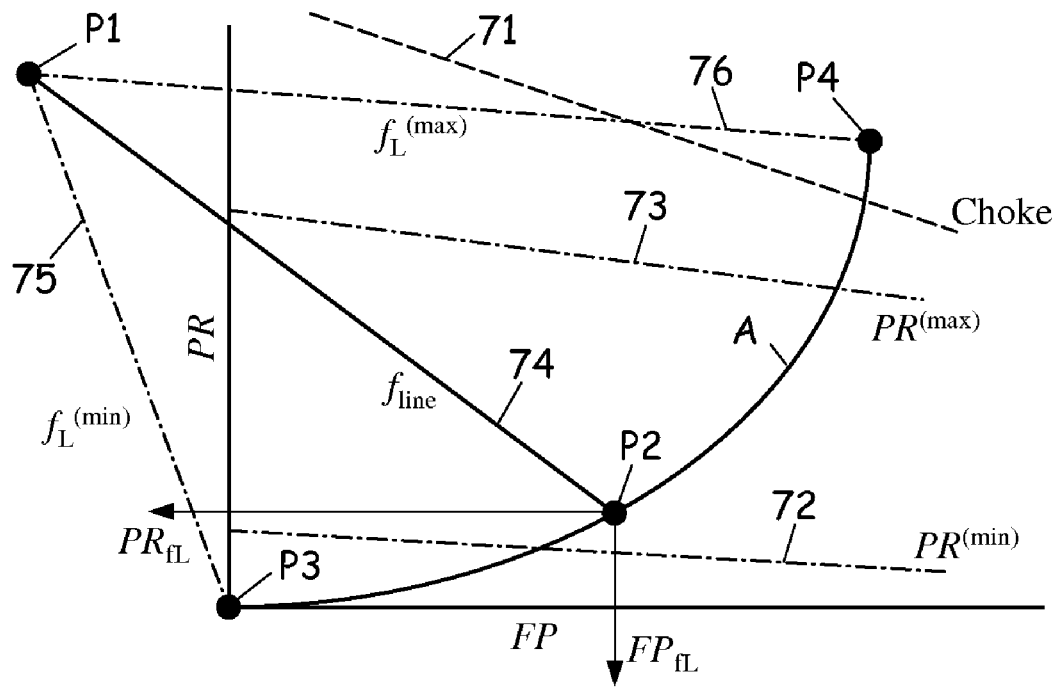
FIG. 8B is a plot of pressure ratio versus flow parameter, showing the relationship between a focal point and the corresponding solution states for a representative flow duct area.

FIG. 8B is a plot of pressure ratio PR versus flow parameter FP, showing the relationship between focal point P1 and corresponding solution state ("f-Line") $f_L$. A particular value of solution state $f_L$ is shown graphically with line 74, as drawn between focal point P1 and solution point P2 on flow curve A, with area A as representative of areas A1-A5 in FIG. 8A, above, and the goal is to generate solution point P2 as an operational modeling point with high fidelity; that is, such that flow parameter FP and pressure ratio PR correspond as closely as possible to their actual (measured or analytically derived) values across the aperture area.

The methods of FIGS. 8A and 8B thus ensure robust FP and PR evaluation across the operating range, including the low-flow and choked flow regions. One aspect is the introduction of solution state $f_L$, which is an element of solution state vector $X_d$ (alternatively, a component of solver state vector $U_S$, which in turn is a subset of constraint vector $U_K$). The $f_L$ solution state is defined as the slope of the line extending from a focal point located off curves A1-A5, as selected to ensure robust mapping of pressure ratio PR and flow parameter FP across the entire operating range, including both the low-flow region below $PR^{(min)}$ and throughout the approach to choked flow above $PR^{(max)}$.

In particular, solution state $f_L$ is determined by the slope of solution line 74 between focus P1 and solution point P2, where solution point P2 lies anywhere along curve A between minimum flow point P3 and maximum flow point P4. This generates a relationship between pressure ratio PR and flow parameter FP as a function of solution state $f_L$, rather than the slope of area curve A.

By selecting focus point P1 appropriately, pressure ratio PR and flow parameter FP are reliably mapped in regions below $PR^{(min)}$ and above $PR^{(max)}$, where the slope of curve A is either too large or too small to produce stable single-pass solutions. In particular, focus point P1 is selected such that solution state $f_L$ extends down to minimum $f_L^{(min)}$, as defined by the slope of minimum solution line 75 between focus P1 and minimum flow point P3, where minimum flow point P3 lies below $PR^{(min)}$ and approaches the point of zero flow. Solution state $f_L$ also extends to maximum $f_L^{(max)}$, as defined by the slope of maximum solution line 76 between focus point P1 and maximum flow point P4, where maximum flow point P4 lies above $PR^{(max)}$ and approaches the region of choked flow, in some cases extending above choke line 71 to the region of fully choked flow.

Solution state $f_L$ is an actively defined state in which the corresponding elements of error vector E are determined by appropriate functional relationships with the corresponding incremental changes $\Delta PR$ and $\Delta FP$ in pressure ratio PR and flow parameter FP, respectively.

When pressure ratio PR is the derived quantity, for example (that is, $PR=f(FP)$, such that pressure ratio PR derived as a function of flow parameter PR), the corresponding error term is $FP-FP_{fL}$. This corresponds to an element of error solver vector $E_S$ (in turn, a subset of error vector E), which depends on the difference between the actual (physically measured or derived) value of the flow parameter (FP) and the (constrained) value read from the flow map ($FP_{fL}$), based on solution state A. Similarly, when flow parameter FP is the derived quantity, the functional form is $FP=f(PR)$ and the corresponding error term is $PR-PR_{fL}$, where PR is the actual value and $PR_{fL}$ is the (constrained) value read from the flow map based on $f_L$.

In general, focal point P1 is defined in order to generate error vector E as a "solver friendly" function of solution state $f_L$, providing single-pass modeling solutions that robustly minimize elements E(PR) and E(PR) of error vector E across the entire operating range of the turbine system. In particular, focal point P1 is selected to robustly minimize error vector E by defining appropriate solution states fL that extend from minimum solution state $f_L^{(min)}$ at minimum flow point P3, approaching the region of zero flow below $PR^{(min)}$, to maximum solution state $f_L^{(max)}$ at maximum flow point P4, approaching the region of choked flow above $PR^{(max)}$. In some embodiments, maximum solution state $f_L^{(min)}$ is also defined for maximum flow point P4 above choke line 71, as shown in FIG. 8B, such that solution states fL span the entire physical range from zero to fully choked flow, as described above.

Figure 9:
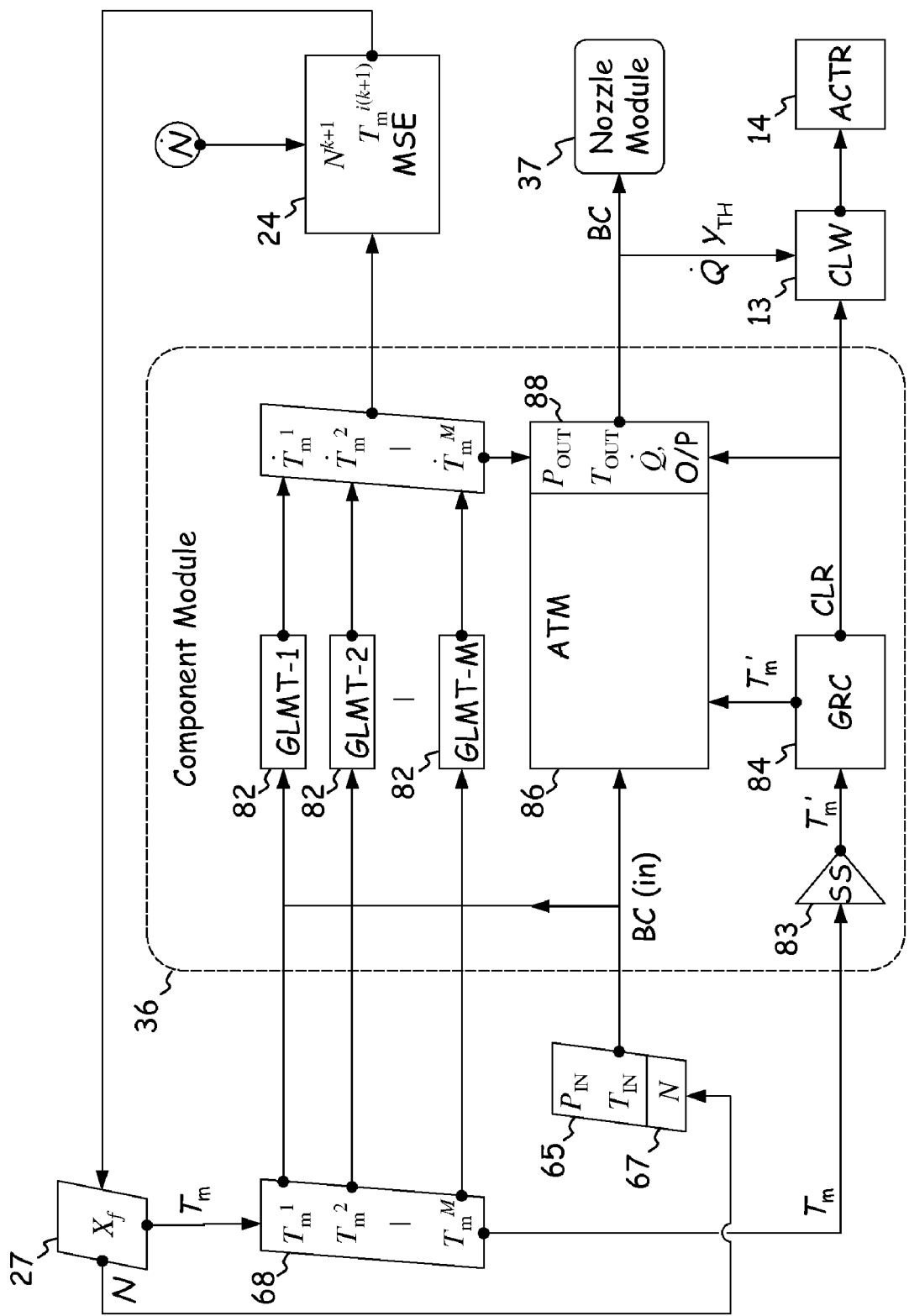
FIG. 9 is a schematic diagram illustrating the application of high-fidelity integrated heat transfer and clearance analysis to a dynamic component-level control system.

FIG. 9 is a schematic diagram of generic component module 36, illustrating the application of high-fidelity integrated heat transfer and clearance analysis to improve the fidelity of on-board modeling estimates and to enhance the functionality of control law (CLW) 13. In particular, FIG. 9 illustrates the use of lumped material temperature states $T_m^i$ in generating clearance signal CLR, heat transfer Q and other outputs Y such as thrust ($Y_{TH}$), which are utilized by CLW 13 and actuator 14 to control the apparatus that is modeled (at least in part) by generic module 36.

In turbine-based embodiments, for example, module 36 typically represents one of compressor module 31, combustor/burner module 32, turbine module 33 or nozzle module 34, as shown in FIG. 3, above, and control law (CLW) 13 directs actuator 14 to control tip clearance, compressor stall margin, thrust or another related operational parameters. In more generalized applications, generic module 36 models any apparatus operating on a fluid in which (a) there is heat transfer between the fluid and material components of the apparatus, (b) operational parameters depend on heat transfer Q and clearance signal CLR, and (c) the clearance between internal components depends at least in part on thermal expansion.

Module 36 comprises a number of generic lumped material temperature (GLMT) modules 82, each associated with a particular material (or metal) temperature state $T_m^i$. Module 36 also includes state selector (SS) 83, generic radial clearance (GRC) module 84 and aero-thermo (thermodynamic)

module (ATM) 86 with output processor (O/P) 88 for generating flow station output including clearance signal CLR, heat transfer Q and thrust $Y_{TH}$.

As shown in FIG. 9, lumped material temperature states $T_m^i$ are incorporated into local subset 68 of physics states 27 ($X_f$). Material temperature states $T_m^i$ run from i=1 to i=M, and are associated with clearance-related turbine elements such as blades and vanes, and with associated flow boundary components including both stationary elements such as a housing or casing and rotating elements such as a hub, rotor or shaft. GLMT modules 82 generate state vector (time) derivatives $\dot{T}_m^i$ for each corresponding temperature state $T_m^i$, and model-state estimator 24 generates time-advanced temperature states $T_m^{(k+1)}$ therefrom.

In turbines and other rotary engine applications, physics states $X_f$ also include shaft speed N, which is typically input to module 36 as one of externally-calculated component-level physics states 67. In addition, external inputs 65 include boundary conditions $P_{IN}$ and $T_{IN}$, which describe upstream flow conditions, for example combustor pressure $P_B$ and combustor temperature $T_B$ as generated by an upstream combustor module for a downstream turbine module, or other upstream boundary conditions for an inlet, compressor or turbine as shown in FIG. 3, above.

State selector 83 selects subset $T_m'$ of lumped material temperature states $T_m^i$ for use by GRC module 84, which generates radial clearance output CLR for control law 13 and actuator 14. Aero-thermo module 86 generates adiabatic fluid station information, which is utilized by output processor 88 in combination with temperature state derivatives $\dot{T}_m^i$ to generate the flow station output, including outlet boundary conditions such as pressure and temperature $P_{OUT}$ and $T_{OUT}$ for generic downstream module 37, for example downstream boundary conditions for a compressor, combustor, turbine or nozzle (see FIG. 3).

In some embodiments, control law 13 directs actuator 14 (see FIG. 1) to control clearance within the physical turbine component associated with module 36, for example by opening or closing a valve to regulate cooling flow onto the outside of a turbine casing, thus maintaining tip clearance within a particular operational range. In this embodiment, CLW 13 is directed based on clearance signal CLR and other relevant output, and actuator 14 controls cooling fluid flow from a relatively low-temperature source such as the compressor or bypass duct.

In other embodiments, CLW 13 directs actuator 14 to limit fuel flow or vane positions for thrust control, or for other thrust-related functions such as compressor stall margin control. During acceleration, for example, heat transfer $\dot{Q}$ is typically positive (that is, from the working fluid to the turbine components), while in deceleration heat transfer $\dot{Q}$ is typically negative (that is, from the turbine components to the working fluid). Hot re-acceleration occurs when the turbine has not had sufficient time to cool from a previous high thrust demand, and CLW 13 sometimes directs actuator 14 to limit fuel flow (i.e., thrust) based on heat transfer $\dot{Q}$. Alternatively, a combination of heat transfer $\dot{Q}$, clearance signal CLR and other outputs are utilized to control fuel flow and vane positions under other operating conditions such as hot deceleration (i.e., after takeoff), in level flight (cruising) or on approach, in order to more accurately model thrust output $Y_{TH}$. This improves engine performance and reduces wear by more accurately matching thrust control to actual thrust delivery.

In the integrated approach heat transfer and clearance control described herein, a single set of physics-based material temperature states $T_m^i$ are selected to account for substantially all heat transfer to and from the working fluid. This allows high fidelity clearance data to be obtained from physics-based heat transfer calculations and thermal growth analysis, improving steady state fidelity and transient response to provide accurate and cost-effective real-time turbine control systems with reduced code and maintenance requirements.

More specifically, the lumped material temperature representation is derived by applying the First Law of Thermodynamics to a model system consisting of a solid material object of mass m with specific heat $c_p$ (at constant pressure, per unit mass), with uniform density and average temperature $T_m$. Mass m exchanges heat with a finite number of fluid streams, resulting in the following first-order differential equation:

$$\dot{Q} = c_p m \frac{dT_m}{dt}, \qquad [44]$$

where $\dot{Q}$ is the rate of heat transfer. The heat transfer is defined by the time rate of change in energy $E_{Sys}$ of the system (that is, the energy of the lumped material component with mass m), such that $$\dot{Q} = \frac{d}{dt} E_{sys}. \qquad [45]$$

In terms of the individual fluid streams j=1 to j=S, the heat transfer is:

$$\dot{Q} = \sum_{j=1}^{S} A_j h_j T_j - T_m \sum_{j=1}^{S} A_j h_j, \qquad [46]$$

where $A_j$ is area of contact with individual fluid stream j, and where $h_j$ and $T_j$ are the heat transfer coefficient and temperature of the fluid stream, respectively. Metal temperature $T_m$ appears in the second (negative) term, which accounts for heat loss, such that $\dot{Q}$ is positive for net heat transfer to mass m (i.e., heating), and $\dot{Q}$ is negative for net heat transfer away from mass m (i.e., cooling).

Contact areas $A_j$ and heat transfer components $h_j$ are difficult to derive from first principles, due to complex component geometry and flow conditions. These terms are thus approximated by using semi-empirical expressions such as:

$$A_j h_j = k_j \{\Pi_j\}^{L_j} \qquad [47]$$

and $$\Pi_j = f(T_j, W_j, P_j, N). \qquad [48]$$

In these expressions, $k_j$ is an empirical constant and $L_j$ is a parametric power used to approximate parameter $\Pi_j$, which in turn is a function of fluid stream temperature $T_j$, flow rate $W_j$, fluid stream pressure $P_j$ and shaft speed N. Substituting into the heat transfer equation, $$\dot{Q} = \sum_{j=1}^{S} \{k_j \cdot (T_j, W_j, P_j, N)^{L_j} \cdot T_j\} - T_m \sum_{j=1}^{S} \{k_j \cdot f(T_j, W_j, P_j, N)^{L_j}\}. \qquad [49]$$

The lumped material temperature approximation seeks a set of coefficients $k_j$ and $L_j$ that determine the heat transfer to mass each $m_i$ with high fidelity, in order to quickly and accurately calculate additional parameters such as exit pressure and exit temperature.

The exit temperature, for example, is determined by rewriting the First Law of Thermodynamics in terms of the control volume within the gas turbine engine component of interest. The energy of the control volume ($E_{c.v.}$) includes a contribution for each individual fluid stream (from j=1 to j=S), as well as the total rate of mechanical energy transfer to the working fluid (PWR). Thus $$\frac{d}{dt}E_{c.v.} = PWR + \sum_{j=1}^{S} W_j(c_p)_j T_j - \sum_{i=1}^{M} \dot{Q}_i - \langle c_p \rangle_{out} \langle T \rangle_{out} \sum_{j=1}^{S} W_j, \qquad [50]$$

where each individual fluid stream j has mass flow rate $W_j$, temperature $T_j$ and specific heat $(c_p)_j$ (at constant pressure, per unit mass). The negative (loss) terms include heat transfer ($\dot{Q}_i$) to each material element i=1 to i=M (that is, heat transfer to the blades, vanes, rotors and compressor housing or turbine casing), and an exit flow term defined in terms of average exit temperature $\langle T \rangle_{out}$ and average specific heat $\langle c_p \rangle_{out}$, and where the exit flow is summed over each individual flow stream j=1 to j=S.

In general, the time rate of change of energy can also be defined in terms of the specific heat $c_v$ (at constant volume, per unit mass), based on the time derivatives of the average temperature ($T_{c.v.}$) and mass ($M_{c.v.}$) within the control volume:

$$\frac{d}{dt}E_{c.v.} = c_v M_{c.v.} \frac{dT_{c.v.}}{dt} + c_v T_{c.v.} \frac{dM_{c.v.}}{dt}. \qquad [51]$$

For particular systems and timescales of interest, total mass $M_{c.v.}$ of the control volume is relatively small as compared to that of lumped material masses $m_i$ (that is, the mass of the working fluid is small as compared to mass of the turbine apparatus itself), and is relatively constant. In this case the energy within the control volume ($E_{c.v.}$) is also approximately constant, and the previous expression can be rewritten in terms of average exit temperature $\langle T \rangle_{out}$:

$$\langle T \rangle_{out} = \frac{PWR - \sum_{i=1}^{M} \dot{Q}_i + \sum_{j=1}^{S} W_j(c_p)_j T_j}{\langle c_p \rangle_{out} \sum_{j=1}^{S} W_j}. \qquad [52]$$

These equations are used in GLMT modules 82 for modeling heat transfer between the working fluid and the individual turbine components, and for determining time rates of change $\dot{T}_m^i$ for the lumped material component temperatures $T_m^i$, as shown in FIG. 9. In particular, GLMT modules 82 and output processor 88 utilize these heat transfer methods to determine an actual exit temperature $\langle T \rangle_{out}$ (e.g., turbine exit temperature $T_T$, or a compressor, combustor or nozzle exit temperature.

A subset $T_m'$ of material temperature states $T_m$ (that is, $T_m^i$) is also used to model thermal growth for tip clearance analysis. The relevant subset depends on turbine, compressor and fan configuration, and is determined by subset selector (SS)

83. Generic radial clearance (GRC) module 84 then applies radial growth equations to the relevant subset, for example:

$$dR_i = R_i \alpha_i (dT_m^i), \qquad [53]$$

where $\alpha_i$ is the coefficient of thermal expansion and $dR_i$ is the infinitesimal change in radius R, of component i at temperature $T_m^i$. The change in radius $R_i$ can also be defined in terms of a finite change $\Delta R_i$ based on the deviation from a "standard" or baseline temperature $T_0$; that is, $$\Delta R_i = R_i \alpha_i (T_m^i - T_0). \qquad [54]$$

In the particular case of a rotary component inside a compressor housing or turbine casing, increases in the radius of the case ($\Delta R_{case} > 0$) tend to increase clearance CLR, both between rotor blades (mounted to the rotor) and the casing, and between stator vanes (mounted to the casing) and the rotor (that is, between the vanes and the hub or spool shaft). Increases in the radius of the rotor ($\Delta R_{rotor} > 0$), on the other hand, tend to decrease clearance CLR.

There is also a mechanical contribution, which can have either sign depending on (for example) spool speed N and overpressure P within the control volume. Thus $$\Delta R_{mech} = \pm f_{mech}(N, P), \qquad [55]$$

where spool speed N typically contributes via a centripetal term that varies with $N^2$, and pressure P is an internal pressure (or overpressure) determined by the upstream and downstream boundary conditions. This gives a net (total) clearance of the form $$CLR = CLR_0 + \Delta R_{case} - \Delta R_{rotor} + \Delta R_{mech}, \qquad [56]$$

where $CLR_0$ is the nominal or "standard" clearance for a stationary rotor (N=0) with no internal pressure (P=0), as defined at temperature $T=T_0$.

As applied in tip clearance control, clearance signal CLR is provided to control law 13, which directs actuator 14 to maintain the clearance within a particular range, for example by increasing or decreasing the rate of cooling flow onto a turbine case or other engine component as described above. Alternatively, the clearance signal is provided in difference form, for example as a difference $\Delta CLR$ from nominal clearance $CLR_0$:

$$\Delta CLR = R_{case} \alpha_{case}(T_m^{case} - T_0) - R_{rotor} \alpha_{rotor}(T_m^{rotor} - T_0) \pm f_{mech}(N^2, P). \qquad [57]$$

In this embodiment, control law 13 is typically configured to direct the actuator in order to minimize the difference signal (that is, to minimize $\Delta CLR$).

Figure 10:
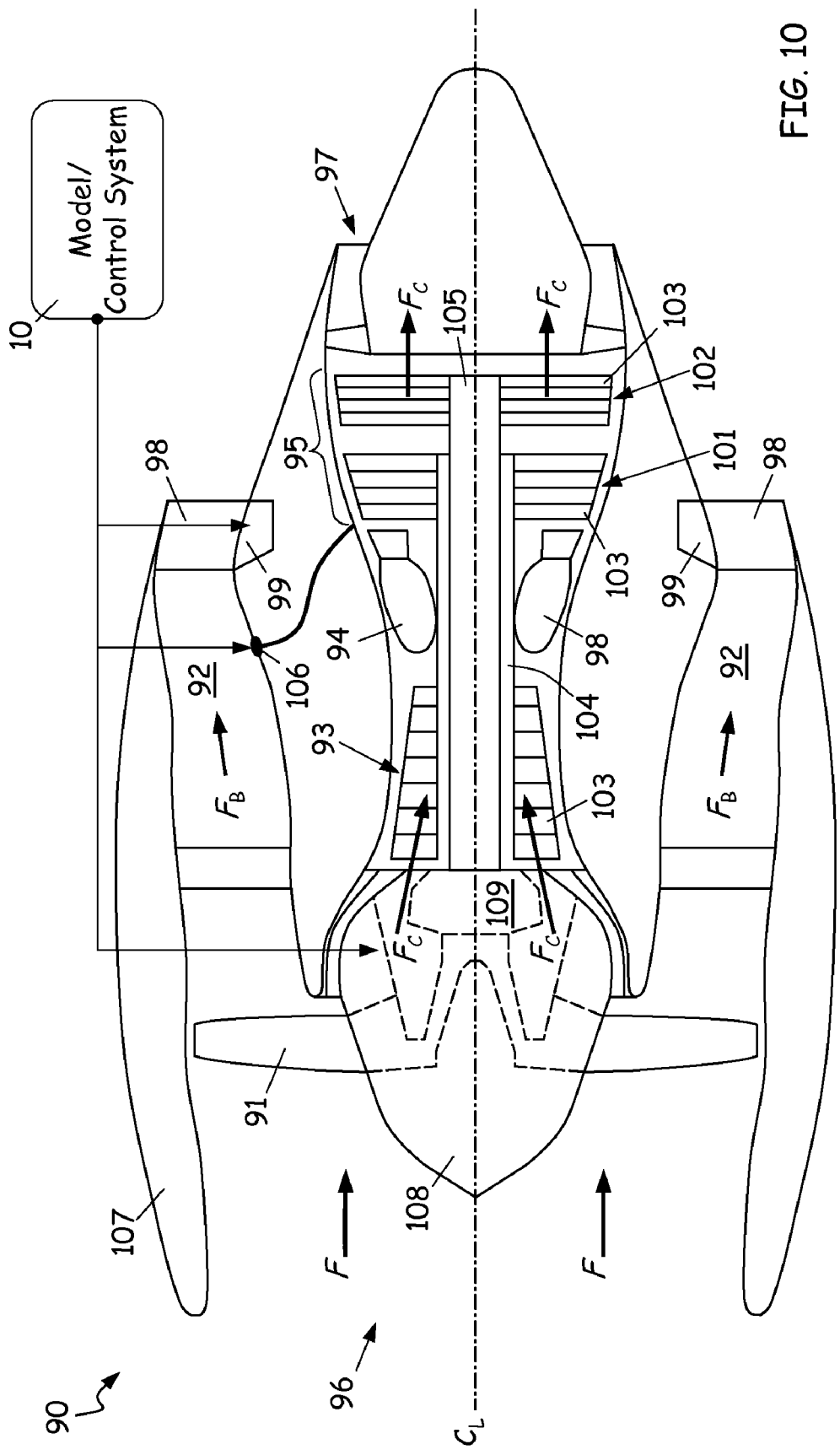
FIG. 10 is a cross-sectional view of turbine engine 90, illustrating an application of the control system in FIG. 1 to a particular turbofan apparatus.

FIG. 10 is a cross-sectional view of turbine engine 90, illustrating the use of model/control system 10 with a turbofan apparatus. Turbofan engine 90 comprises fan 91 with bypass duct 92 oriented about a turbine core comprising compressor 93, combustor(s) 94 and turbine 95, which are arranged in flow series with upstream inlet 96 and downstream exhaust 97. Variable area nozzle 98 is positioned in bypass duct 92 in response to adjustment by vane actuator(s) 99.

Turbine 95 comprises high-pressure (HPT) section 101 and low-pressure (LPT) section 102. Compressor 93 and turbine sections 101 and 102 each comprise a number of alternating blade and vane airfoils 103. HPT section 101 of turbine 95 is coupled to compressor 93 via HPT shaft 104, forming the high pressure spool. LPT section 102 is coupled to fan 91 via LPT shaft 105, forming the low pressure or fan spool. LPT shaft 105 is coaxially mounted within HPT shaft 104, about turbine axis (centerline) $C_L$, such that the HPT and LPT spools rotate independently.

In operation of turbofan 10, airflow F enters via inlet 96 and divides into bypass flow FB and core flow FC downstream of fan 91. Bypass flow FB passes through bypass duct 92, generating thrust, and core flow FC passes along the gas path through compressor 93, combustor(s) 94 and turbine 95. Compressor 93 compresses incoming air for combustor(s) 94, where it is mixed with fuel and ignited to produce hot combustion gas. The combustion gas exits combustor(s) 94 to enter HPT section 101 of turbine 95, driving HPT shaft 104 and compressor 93. Partially expanded combustion gas transitions from HPT section 101 to LPT section 102, driving fan 91 via LPT shaft 105. Exhaust gas exits turbofan 90 via exhaust 97.

System 10 maintains rotating clearance between airfoils 103 and the HPT and LPT spools (and the compressor housing and turbine case) as described above, for example by utilizing cooling flow vale 106 to direct cooling flow from bypass duct 92 to compressor 93, HPT section 101 or LPT section 102.

As shown in FIG. 10, fan 91 is forward-mounted in engine cowling 107, upstream of bypass duct 92 and compressor 93, with spinner 108 covering the fan disk to improve aerodynamic performance. Alternatively, fan 91 is aft-mounted in a downstream location, and the coupling configuration varies. Further, while FIG. 10 illustrates a particular two-spool high-bypass turbofan embodiment of turbine engine 90, this example is merely illustrative. In other embodiments turbine 90 is configured either as a low-bypass turbofan or a high-bypass turbofan and the number of spools and fan position vary, including, but not limited to, two-spool and three-spool turbofans, high and low bypass turbofans, turbojet and turboprop engine designs.

In the particular embodiment of FIG. 10, fan 91 is coupled to LPT shaft 105 via a planetary gear or other geared fan drive mechanism 109 (shown in dashed lines), which provides independent fan speed control. More specifically, fan gear 109 allows turbofan 90 with control system 10 to control the rotational speed of fan 91 independently of the high and low spool speeds (that is, independently of HPT shaft 104 and LPT shaft 105), increasing the operational control range for improved engine response and efficiency.

Variable area nozzle (VAN) 98 comprises a number of control surfaces positioned along bypass flow $F_B$ or core flow $F_c$, for example at the downstream end of bypass duct 92 (as shown in FIG. 10) or in exhaust nozzle 97. Control system 10 directs vane actuators 99 to regulate bypass flow $F_B$ and core flow $F_c$ as a function of the thrust delivered by turbofan 10, for example by adjusting the position of VAN 98 to restrict the area of bypass duct 92 in order to reduce fan flutter during idle approach or descent, or to restrict the area of exhaust nozzle 97 for specific thrust control during high-performance operations. VAN 98 also modifies the bypass ratio (BPR) between bypass flow $F_B$ and core flow $F_c$, because the core and bypass flows are coupled in the region of fan 91.

Fan gear mechanism 108 allows control system 10 to further regulate one or both of bypass flow $F_B$ and core flow $F_c$ by independently adjusting the speed of fan 91. In one such embodiment, for example, turbofan 90 utilizes fan gear 108 to increase efficiency and reduce engine noise (including noise from fan 91) by synchronizing airspeed and turbofan exhaust velocity during takeoff, climb, or landing.

While this invention has been described with reference to particular embodiments, the terminology used is for the purposes of description, not limitation. Workers skilled in the art will recognize that changes may be made in form and detail without departing from the spirit and scope of the invention, including the substitution of various equivalents for particular invention elements and adaptation of the invention's teachings to different materials, situations and circumstances. Thus the invention is not limited to the particular embodiments disclosed herein, but encompasses all embodiments falling within the scope of the appended claims.

The invention claimed is:

1. A system comprising:
a rotary apparatus comprising a rotor and a housing, the rotor and the housing forming a gas path therebetween;
a control law for controlling flow along the gas path; and
a processor for generating an output to direct the control law, the processor comprising:
an output module for generating the output as a function of a plurality of rotor and housing temperatures defined along the gas path;
a plurality of temperature modules for determining time derivatives of the rotor and housing temperatures;
a thermodynamic module for modeling boundary conditions along the gas path, based on the rotor and housing temperatures;
a comparator for determining errors in the boundary conditions; and
an estimator for estimating the rotor and housing temperatures based on the time derivatives, such that the errors are minimized and the flow is controlled along the gas path;
wherein the output comprises a heat transfer signal based on heat transfer from the flow to the rotary apparatus, and wherein the control law controls the flow along the gas path by controlling fuel flow to the rotary apparatus based on the heat transfer signal.

2. The system of claim 1, wherein the estimator comprises a single-input, single-output gain matrix that relates each of the temperature states to exactly one of the time derivatives.

3. The system of claim 1, wherein the boundary conditions comprise an inlet temperature, an inlet pressure, an exit temperature and an exit pressure, and wherein the thermodynamic module models the exit temperature based on the inlet temperature and the rotor and housing temperatures.

4. The system of claim 1, further comprising an actuator for regulating the fuel flow to the rotary apparatus, and wherein the control law limits thrust by directing the actuator to limit the fuel flow.

5. The system of claim 1, wherein the output comprises a clearance signal and the control law controls the flow by controlling clearance along the gas path, based on the clearance signal.

6. The system of claim 5, wherein the function of the rotor and housing temperatures is also a function of a rotational speed of the rotor, such that the output module generates the clearance signal based on the rotor and housing temperatures and a spool speed of the rotary apparatus.

7. The system of claim 6, further comprising an actuator for regulating coolant flow onto the housing, and wherein the control law maintains the clearance within an operational range by directing the actuator to regulate the coolant flow onto the housing.

8. The system of claim 6, wherein the rotor comprises a plurality of rotor blades and the function of the rotor and housing temperatures comprises a coefficient of thermal expansion of the housing, such that the output module generates the clearance signal based on spacing between the rotor blades and the housing.

9. The system of claim 6, wherein the housing comprises a plurality of stator vanes and the function of the temperature states comprises a coefficient of thermal expansion of the rotor, such that the control signal is based on spacing between the stator vanes and the rotor.

10. A method for controlling flow along a gas path between a rotor and a housing, the method comprising:
  modeling boundary conditions along the gas path, wherein the boundary conditions comprise an inlet temperature, and inlet pressure, an exit temperature and an exit pressure;
  determining errors in the boundary conditions, based on thermodynamic constraints along the flow path;
  modeling material temperatures for a plurality of rotor and housing materials along the gas path, based on the inlet temperature;
  generating a control signal based on the material temperatures and on coefficients of thermal expansion of the rotor and housing materials;
  determining time rates of change of the material temperatures, based on heat transfer along the gas path;
  controlling the flow based on the control signal, such that the boundary conditions are maintained within an operational range; and
  updating the material temperatures based on the time rates of change, such that the errors in the boundary conditions are minimized.

11. The method of claim 10, wherein updating the material temperatures based on the time rates of change is performed such that the time rates of change are minimized.

12. The method of claim 10, wherein controlling the flow comprises regulating a coolant flow based on the control signal, such that clearance is maintained between the rotor and the housing.

13. The method of claim 12, wherein generating the control signal comprises generating a clearance control signal based on the material temperatures, the coefficients of thermal expansion, a spool speed of the rotor and an internal pressure within the housing.

14. The method of claim 10, wherein controlling the flow comprises regulating a fuel flow based on the control signal, such that a compressor stall margin is controlled for the rotor.

15. The method of claim 14, wherein generating the control signal comprises generating a heat transfer signal based on the material temperatures and specific heats of the rotor and housing materials.

16. A turbine comprising:
  a rotor having a plurality of rotor blades extending radially therefrom;
  a casing positioned about the rotor blades, such that a gas path is formed between the rotor and the casing;
  a valve actuator for maintaining clearance along the gas path by regulating cooling fluid flow onto the casing; and
  a controller for directing the valve actuator based on a control signal, the controller comprising:
    a control module for generating the control signal as a function of a plurality of rotor and casing temperatures defined along the gas path;
    a plurality of temperature modules for determining time derivatives of the rotor and casing temperatures;
    a thermodynamic module for modeling boundary conditions for the gas path, based on the rotor and casing temperatures;
    a comparator for determining errors in the boundary conditions, based on thermodynamic flow constraints; and
    an estimator for estimating the rotor and casing temperatures based on the time derivatives, such that the errors in the boundary conditions are minimized and the clearance is maintained.

17. The system of claim 16, wherein the control module generates the control signal as a function of the rotor and casing temperatures and a rotational speed of the rotor, such that the control signal accounts for centripetal acceleration of the rotor blades.

18. The system of claim 17, wherein the control module generates the control signal as a function of specific heats of the rotor and the casing, such that the control signal accounts for thermal transfer along the gas path.

19. The system of claim 18, further comprising a flow actuator for limiting thrust by regulating fuel flow to the turbine, based on the thermal transfer.

20. A system comprising:
  a rotary apparatus comprising a rotor and a housing, the rotor and the housing forming a gas path therebetween;
  a control law for controlling flow along the gas path; and
  a processor for generating an output to direct the control law, the processor comprising:
    an output module for generating the output as a function of a plurality of rotor and housing temperatures defined along the gas path;
    a plurality of temperature modules for determining time derivatives of the rotor and housing temperatures;
    a thermodynamic module for modeling boundary conditions along the gas path, based on the rotor and housing temperatures;
    a comparator for determining errors in the boundary conditions; and
    an estimator for estimating the rotor and housing temperatures based on the time derivatives, such that the errors are minimized and the flow is controlled along the gas path;
  wherein the output comprises a clearance signal and the control law controls the flow by controlling clearance along the gas path, based on the clearance signal;
  wherein the function of the rotor and housing temperatures is also a function of a rotational speed of the rotor, such that the output module generates the clearance signal based on the rotor and housing temperatures and a spool speed of the rotary apparatus; and
  wherein the housing comprises a plurality of stator vanes and the function of the temperature states comprises a coefficient of thermal expansion of the rotor, such that the control signal is based on spacing between the stator vanes and the rotor.

* * * * *